US010552792B2

(12) United States Patent
Mattingly et al.

(10) Patent No.: US 10,552,792 B2
(45) Date of Patent: Feb. 4, 2020

(54) SYSTEMS AND METHODS FOR RESIDUAL INVENTORY MANAGEMENT WITH MOBILE MODULAR DISPLAYS

(71) Applicant: Walmart Apollo, LLC, Bentonville, AR (US)

(72) Inventors: Todd D. Mattingly, Bentonville, AR (US); Greg A. Bryan, Centerton, AR (US); Benjamin D. Enssle, Bella Vista, AR (US); David C. Winkle, Bella Vista, AR (US); Cristy C. Brooks, Cassville, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/855,843

(22) Filed: Dec. 27, 2017

(65) Prior Publication Data

US 2018/0189725 A1     Jul. 5, 2018

Related U.S. Application Data

(60) Provisional application No. 62/440,116, filed on Dec. 29, 2016, provisional application No. 62/440,136, (Continued)

(51) Int. Cl.
*G06Q 10/08* (2012.01)
*B65G 1/10* (2006.01)
(Continued)

(52) U.S. Cl.
CPC ............. *G06Q 10/087* (2013.01); *B65G 1/02* (2013.01); *B65G 1/10* (2013.01); *G05D 1/0088* (2013.01);
(Continued)

(58) Field of Classification Search
CPC .................. G06F 3/1446; B65G 1/10
See application file for complete search history.

(56) References Cited

U.S. PATENT DOCUMENTS 4,180,277 A   12/1979   Romero
5,443,168 A    8/1995   Dyment
(Continued)

FOREIGN PATENT DOCUMENTS

WO      1994019642      9/1994

OTHER PUBLICATIONS

PCT; App. No. PCT/US2017/068456; International Search Report and Written Opinion dated Mar. 12, 2018.
(Continued)

*Primary Examiner* — Thomas Randazzo
(74) *Attorney, Agent, or Firm* — Fitch, Even, Tabin & Flannery LLP

(57) ABSTRACT

Systems, apparatuses, and methods are provided herein for managing residual mobile display inventory. A system for managing a store inventory comprises a plurality of mobile modular displays, a mobile modular display inventory database, and a control circuit coupled to the mobile modular display inventory database and configured to: track, in the mobile modular display inventory database, inventory levels of mobile modular displays in a store location, detect a modular display replacement condition, cause a replacement mobile modular display to be deployed to replace the at least one mobile modular display on at a sales floor of the store location in response to detecting the modular display replacement condition, and determine a residual handling instruction selected from a plurality of residual handling methods for the residual products, and communicate the residual handling instruction to a user interface device.

20 Claims, 6 Drawing Sheets

Related U.S. Application Data filed on Dec. 29, 2016, provisional application No. 62/440,142, filed on Dec. 29, 2016, provisional application No. 62/440,147, filed on Dec. 29, 2016.

(51) Int. Cl.
| | | |
|---|---|---|
| *G06F 3/14* | (2006.01) | |
| *G06Q 10/06* | (2012.01) | |
| *G06K 19/07* | (2006.01) | |
| *G06F 16/26* | (2019.01) | |
| *G06F 16/23* | (2019.01) | |
| *B65G 1/02* | (2006.01) | |
| *G09F 21/04* | (2006.01) | |
| *G05D 1/00* | (2006.01) | |

(52) U.S. Cl.
CPC ........ *G06F 3/1446* (2013.01); *G06F 16/2379* (2019.01); *G06F 16/26* (2019.01); *G06K 19/0723* (2013.01); *G06Q 10/0631* (2013.01); *G09F 21/048* (2013.01)

(56) References Cited

U.S. PATENT DOCUMENTS

| | | | |
|---|---|---|---|
| 5,711,438 A | 1/1998 | Smith | |
| 7,766,348 B2 | 8/2010 | McFarland | |
| 8,091,715 B2 | 1/2012 | Roth | |
| 8,321,303 B1 | 11/2012 | Krishnamurthy | |
| 8,972,045 B1 | 3/2015 | Mountz | |
| 9,123,016 B2 | 9/2015 | Jones | |
| 9,754,238 B2 | 9/2017 | Lyon | |
| 2003/0154141 A1 | 8/2003 | Capazario | |
| 2005/0075954 A1* | 4/2005 | Matsumoto | G06Q 10/087 |
| | | | 705/28 |
| 2005/0110373 A1 | 5/2005 | Assmann | |
| 2007/0125727 A1* | 6/2007 | Winkler | A47F 10/00 |
| | | | 211/59.2 |
| 2008/0086985 A1 | 4/2008 | Stiles | |
| 2008/0135698 A1 | 6/2008 | Gordon | |
| 2008/0309209 A1 | 12/2008 | McFarland | |
| 2008/0319574 A1* | 12/2008 | Wilke | G06Q 10/08 |
| | | | 700/226 |
| 2009/0043676 A1 | 2/2009 | Riley | |
| 2010/0171826 A1 | 7/2010 | Hamilton | |
| 2010/0320109 A1 | 12/2010 | Trumbauer | |
| 2012/0298688 A1 | 11/2012 | Stiernagle | |
| 2013/0240472 A1 | 9/2013 | Preidt | |
| 2014/0100769 A1* | 4/2014 | Wurman | G06Q 10/087 |
| | | | 701/301 |
| 2014/0172649 A1 | 6/2014 | Cancro | |
| 2014/0258050 A1* | 9/2014 | Abboud | G06Q 10/087 |
| | | | 705/28 |
| 2014/0324642 A1 | 10/2014 | Winkel | |
| 2016/0255969 A1* | 9/2016 | High | A47L 11/4011 |
| 2016/0260148 A1 | 9/2016 | High | |
| 2016/0328767 A1* | 11/2016 | Bonner | G06Q 10/087 |
| 2016/0335586 A1 | 11/2016 | Panchamgam | |
| 2017/0124603 A1* | 5/2017 | Olson | G06Q 30/0277 |

OTHER PUBLICATIONS

PCT; App. No. PCT/US2017/068458; International Search Report and Written Opinion dated Mar. 12, 2018.
PCT; App. No. PCT/US2017/068494; International Search Report and Written Opinion dated Mar. 16, 2018.
U.S. Appl. No. 15/855,817, filed Dec. 27, 2017, Todd D. Mattingly.
U.S. Appl. No. 15/855,837, filed Dec. 27, 2017, Todd D. Mattingly.
U.S. Appl. No. 15/855,874, filed Dec. 27, 2017, Todd D. Mattingly.
PCT; App. No. PCT/US2017/068470 ; International Search Report and Written Opinion dated Mar. 26, 2018.
USPTO; U.S. Appl. No. 15/855,817; Office Action dated Mar. 18, 2019; (pp. 1-7).
USPTO; U.S. Appl. No. 15/855,874; Office Action dated May 14, 2019.

* cited by examiner

SYSTEMS AND METHODS FOR RESIDUAL INVENTORY MANAGEMENT WITH MOBILE MODULAR DISPLAYS

CROSS-REFERENCE TO RELATED APPLICATIONS

This application claims the benefit of the following U.S. Provisional Application No. 62/440,116 filed Dec. 29, 2016, U.S. Provisional Application No. 62/440,136 filed Dec. 29, 2016, U.S. Provisional Application No. 62/440,142 filed Dec. 29, 2016, and U.S. Provisional Application No. 62/440, 147 filed Dec. 29, 2016, which are all incorporated herein by reference in their entirety.

TECHNICAL FIELD

This invention relates generally to retail stores.

BACKGROUND

Brick-and-mortar stores generally have a sales floor and a backroom area. Items offered for sale are typically brought out from the backroom storage area and placed on the sales floor by store associates. In-store customers shop by selecting items off the shelves on the sales floor and bringing items to a checkout counter to make a purchase.

BRIEF DESCRIPTION OF THE DRAWINGS

Disclosed herein are embodiments of apparatuses and methods for use with mobile modular displays. This description includes drawings, wherein.

Figure 1:
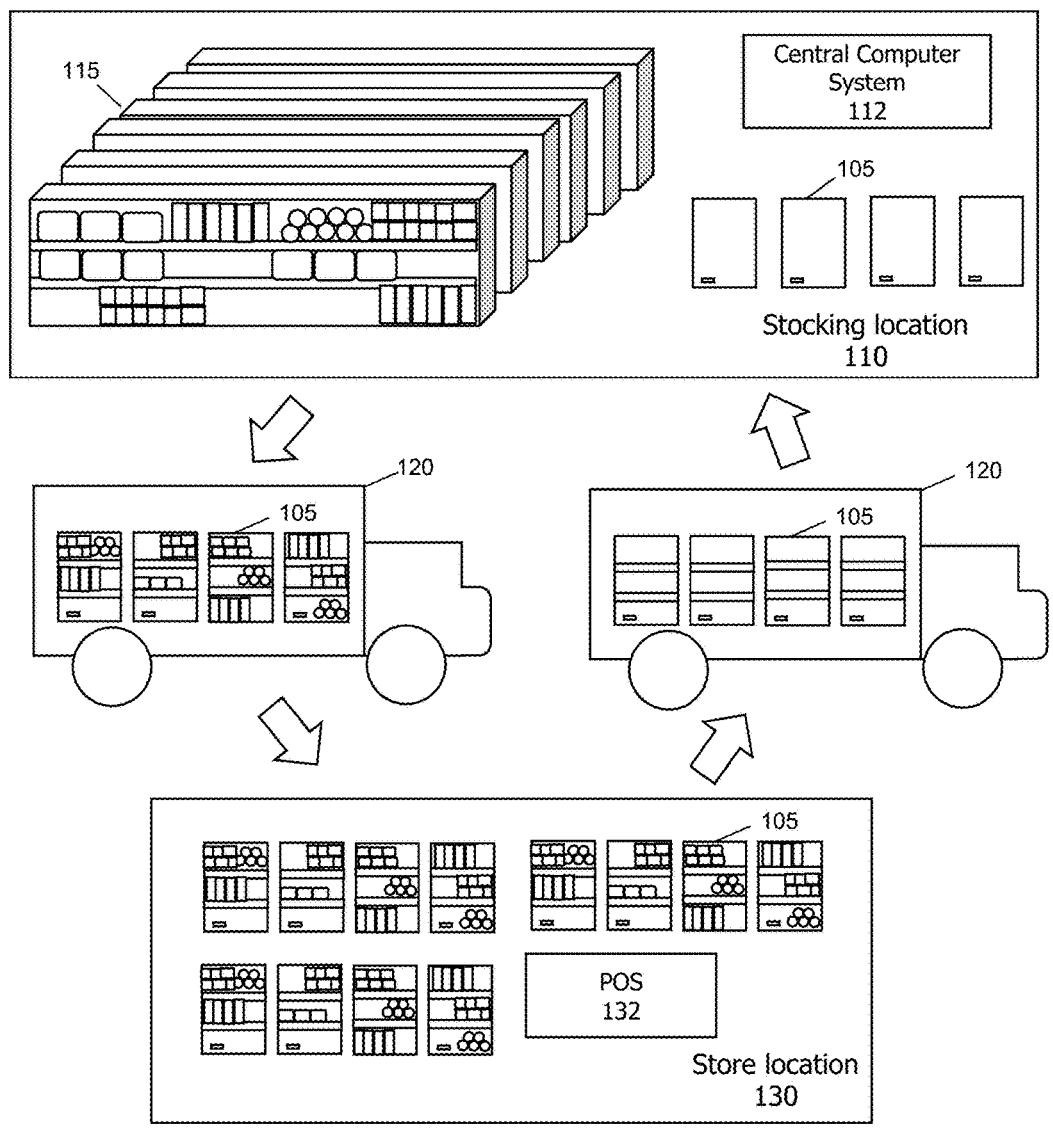
FIG. 1 is an illustration of a system in accordance with several embodiments.

Elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for retail with mobile modular displays.

In some embodiments, a system for stocking a store comprises a plurality of mobile modular displays each configured to be stocked with a plurality of types of products in a plurality of shelf spaces at a stocking location, transport the products to a store location, and display the products at the store location, a sales history database, a store inventory database, and a control circuit coupled to the sales history database and the store inventory database, the control circuit configured to: detect a modular display replacement condition at a store location selling products on a plurality of deployed mobile modular displays, select a plurality of products to stock a mobile modular display from the plurality of mobile modular displays for the store location based on a sales history of the store location stored in the sales history database and a current inventory of the store location stored in the store inventory database, determine a planogram for the plurality of products selected for the mobile modular display, and output an instruction to a stocking system to stock the mobile modular display with the plurality of products in the plurality of shelf spaces according to the planogram and to transport the mobile modular display to the store location for display.

In some embodiments, a system for store management comprises a plurality of mobile modular displays each configured to be stocked with a plurality of types of products in a plurality of shelf spaces at a stocking location, transport the plurality of types of products to a store location, and display the plurality of types of products at the store location, a store layout database, and a control circuit coupled to the store layout database and configured to: determine a store layout of a store location based on products assigned to mobile modular displays assigned to the store location, the store layout comprising in-store locations for the mobile modular displays assigned to the store location, aggregate location information from the mobile modular displays on display in the store location, compare the store layout associated with the store location in the store layout database and the location information of the mobile modular displays, and in an event that a discrepancy is detected between the store layout and the location information, generate a layout correction alert for the store location.

In some embodiments, a system for managing a store inventory comprises a plurality of mobile modular displays each configured to be stocked with a plurality of types of products in a plurality of shelf spaces at a stocking location, transport the plurality of types of products to a store location, and display the plurality of types of products at the store location, a mobile modular display inventory database; and a control circuit coupled to the mobile modular display inventory database and configured to: track, in the mobile modular display inventory database, inventory levels of mobile modular displays in a store location, detect a modular display replacement condition for at least one mobile modular display based on the inventory levels of the mobile modular displays at the store location stored in the mobile modular display inventory database, cause a replacement mobile modular display to be deployed to replace the at least one mobile modular display on at a sales floor of the store location in response to detecting the modular display replacement condition, in an event that residual products remain on the at least one mobile modular display being replaced on the sales floor, determine a residual handling instruction selected from a plurality of residual handling methods for the residual products, and communicate the residual handling instruction to a user interface device.

In some embodiments, an apparatus for product display comprises a housing of a mobile modular display, a wheel system coupled to the housing and configured to travel on the ground and provide mobility to the housing, a plurality of shelf spaces configured to hold a plurality of types of products in a specified arrangement during transport and display the plurality of types of products for customer selection and purchase on a sales floor of a store location, and a location device coupled to the housing, a control circuit coupled to the housing and configured to determine a location of the housing based on the location device.

Referring now to FIG. 1, an illustration of a system is shown. The system includes a plurality of mobile modular displays (MMDs) 105 configured to be transported between a stocking location 110 and a store location 130 by one or more transportation vehicles 120.

In some embodiments, the MMDs 105 are configured to be stocked with a plurality of types of products in a plurality of shelf spaces at a stocking location, transport the products to a store location, and display the products at the store location. In some embodiments, the MMDs 105 may comprise a plurality of shelf spaces configured to hold a plurality of types of products in a specified arrangement during transport and display the plurality of types of products in the specified arrangement for customer selection and purchase on a sales floor of a store location. In some embodiments, an MMD 105 may comprise a location sensor configured to determine the location of the MMD 105. In some embodiments, an MMD 105 may comprise product sensors for monitoring the on-shelf inventory of the MMD 105. In some embodiments, an MMD 105 may comprise a coupler configured to couple with one or more of a store docking structure at the store location 130, another MMD at the store location 130, a docking structure in a transportation vehicle 120, a unmanned ground vehicle (UGV), a conveyor system, and a securing structure at the stocking location. In some embodiments, an MMD 105 may comprise one or more temperature controlled compartments (e.g. refrigerated unit, freezer unit). In some embodiments, the one or more MMD components such as lighting, sensors, signage, and/or temperature control units may be selectively powered by a battery and/or via a power connection to one or more of the stocking location 110, a transportation vehicle 120, and the store location 130. In some embodiments, an MMD 105 may comprise wheels configured to travel on the ground. In some embodiments, an MMD 105 may comprise a UGV configured to travel in the stocking location 110, the store location 130, and/or on a roadway between the stocking location 110 and the store location 130. Further descriptions of embodiments of MMDs are provided with reference to FIGS. 2 and 3 herein.

The stocking location 110 may generally comprise a location at which MMDs are stocked. In some embodiments, the stocking location 110 may comprise a distribution center, a warehouse, an MMD deployment center, a fulfillment center, a supply location, etc. that are generally not accessible to customers. In some embodiments, the stocking location 110 may comprise a backroom of a large format store that is at a separate location from the store location 130. Generally, the stocking location 110 is geographically separated from the store location 130.

The stocking location 110 comprises a central computer system 112 and a product storage system 115. In some embodiments, the central computer system 112 may be configured to select products from the storage system 115 to stock one or more MMDs 105. In some embodiments, the central computer system 112 may be configured to instruct the stocking and deployment of replacement MMDs 105 to the store location 130 when one or more of the deployed MMDs 105 at the store location is low in stock or out of stock. In some embodiments, the central computer system 112 may further be configured to determine the arrangement of the products on one or more of the MMDs 105 and/or the arrangement of a plurality of MMDs 105 at the store location 130. While the central computer system 112 is shown to be inside the stocking location 110 in FIG. 1, in some embodiments, the central computer system 112 may comprise a remote and/or cloud-based server. In some embodiments, the central computer system 112 may manage the stocking of MMDs 105 at two or more stocking locations 110 and supply stocked MMDs 105 to two or more store locations 130. Further descriptions of a central computer system 112 according to some embodiments are provided with reference to FIG. 2 herein. In some embodiments, the central computer system 112 may be configured to perform one or more steps described with reference to FIGS. 4-7 herein.

The storage system 115 of the stocking location 110 may comprise a plurality of storage units such as shelves and bins. In some embodiments, the storage system 115 may be configured to store products in bulk container and/or as individual units. In some embodiments, the storage system 115 may further store dressing and configuration items for the MMD 105. For example, the storage system 115 may store various signs, labels, lights, decorations, dividers, hooks, hangers, etc. that may be added to the MMDs 105. In some embodiments, the stocking location 110 may further comprise a stocking system configured to transfer items from the storage system 115 to the MMDs 105 based on instructions from the central computer system 112. In some embodiments, the stocking system may comprise one or more of a conveyor system, stocking associate user interface devices, UGVs, and the like.

The transportation vehicle 120 comprise a vehicle configured to carry and transport stocked and empty MMDs 105 between the stocking location 110 and the store location 130. In some embodiments, the transportation vehicle 120 may be configured to travel on roadways such as streets, motorways, highways, etc. In some embodiments, the transportation vehicle 120 may comprise a manned or unmanned vehicle. In some embodiments, the transportation vehicle 120 may comprise one or more of a truck, a tracker-trailer, a van, a driverless vehicle, a manned vehicle, and the like. In some embodiments, a system of plurality of transportation vehicles 120 may be configured to transport MMDs 105 between one or more stocking locations 110 and store locations 130. In some embodiments, the transportation vehicle 120 may comprise a cargo compartment for holding a plurality of MMDs 105. In some embodiments, the cargo compartment of the transportation vehicles 120 may comprise grooves and/or rollers on the floor configured to receive the wheels of the MMDs 105. In some embodiments, a transportation vehicle 120 may be configured to tow a plurality of MMDs 105 similar to a train. In some embodiments, the transportation vehicle 120 may comprise couplers for coupling to MMDs 105. In some embodiments, the couplers may comprise anchors configured to stabilize the MMDs 105 during transport. In some embodiments, the couplers may comprise electrical connections configured to supply power to the MMDs 105. For example, power supplied by the couplers on the transportation vehicle 120 may be used by the MMD 105 to cool or heat temperature controlled compartments on the MMDS 105. In some embodiments, the transportation vehicle 120 may further comprise sensors for determining which MMDs 105 are loaded on and/or connected to the vehicle. For example, during the loading of MMDs 105, a transportation vehicle 120 may scan for RFID tags on the MMDs 105 to verify that the correct MMDs 105 are loaded. In some embodiments, the transportation vehicle 120 may communicate with the MMD 105 to relay MMD location, statuses (e.g. temperature, inventory, battery, location, etc.), and/or control data (e.g. temperature to maintain, lighting level to set, shelf label data to display, enter power save mode, etc.). In some embodiments, the transportation vehicle 120 may further communicate with the central computer system 112 to update the location and/or statuses of MMDs 105 and/or receive delivery instructions.

The store location 130 comprises a retail store having a sales floor for displaying a plurality of items for sale. In some embodiments, the store location 130 may comprise a small format store, a convenience store, a neighborhood store, a corner store, and the like. In some embodiments, the store location 130 may comprise little or no backroom storage area. Customers can generally enter the sales floor of the store location 130, browse items on display, select items, and purchase items via the POS system 132. In some embodiments, the store location 130 may only sell items on MMDs 105 or comprise a mixture of MMDs 105 and conventional fixed display structures for selling items. In some embodiments, the store location 130 may further include coupling structures for securing MMDs 105 displayed in the store. For example, the store may comprise floor anchors and/or frames for coupling with and securing the MMDs 105.

In some embodiments, the POS system 132 may comprise one or more of checkout terminals, self-service terminals, a virtual checkout system, an exit sensor, a store management system, and the like. In some embodiments, the POS system 132 may be configured to monitor the on-shelf inventory of one or more MMDs 105 based on customer purchases and/or product sensors on MMDs 105. In some embodiments, the POS system 132 may communicate with product sensors on the MMDs 105 and/or sensors located elsewhere in the store location 130 to determine which items have been selected by customers. In some embodiments, purchases may be automatically charged to a customer's account when the customer exits the store location with the selected products and the estimated on-shelf inventory may be adjusted based on the purchases. In some embodiments, the POS system 132 may be configured to monitor the placement of MMDs 105 to verify that the MMDs are placed according to a planogram assigned to the store location. Further descriptions of POS system 132 are provided with reference to FIG. 2 herein. In some embodiments, the POS system 132 may be configured to communicate with the central computer system 112 via wired and/or wireless connection. In some embodiments, the POS system 132 may be configured to perform one or more steps described with reference to FIGS. 4-7 herein.

In the system shown in FIG. 1, MMDs 105 are stocked at the stocking location 110 with items from the storage system 115 and the items are arranged on the MMD 105 for display at the store location 130 when the MMD 105 leaves the stocking location 110. In some embodiments, the MMDs 105 may further be "dressed" with one or more of signage, lights, price labels, promotional signed, decoration, etc. at the stocking location 110. The MMDs 105 are transported in the arranged and dressed state to the store location 130 on a transportation vehicle 120. When the MMDs 105 arrive at the store location 130, the MMDs 105 may be unloaded and directly placed on the sales floor to display items for sale. In some embodiments, the MMDs 105 may comprise one or more item securing means such as binding, wrapping, cover, door, balloon casing, etc. that may be removed and/or retracted to make the items accessible to customers on the sales floor. In some embodiments, the central computer system 112 may further provide a store layout to instruct the placement and arrangement of MMDs 105 at the store location.

If one or more of the MMDs at the store location 130 is low in stock or out of stock, the central computer system 112 may begin to prepare a replacement MMD to deploy to the store location 130. The replacement MMD 105 may hold the same items or different items as the MMD being replaced. When the replacement MMDs 105 are transported to the store location 130, the transportation vehicle 120 may pick up the MMDs 105 being replaced and transport them back to the stocking location 110. In some embodiments, the central computer system 112 may further provide residual product handling instructions for any products left on the MMDs 105 being replaced. MMDs 105 retrieved by the transportation vehicle 120 may then be stocked again at the stocking location 110 for subsequent deployment to the store location 130 or another store location. With the system shown in FIG. 1, the storage space requirements at the store location 130 may be considerably reduced, allowing a store location to allocate more space to the sales floor. The stocking labor hours at a store location may also be reduced by centralizing shelf stocking tasks at a stocking center. The system may further allow for frequent and dynamic adjustments of the inventory carried at various store locations.

While one stocking location 110 and one store location 130 are shown in FIG. 1, the system may comprise a network of a plurality of stocking locations 110 and store locations 130. For example, a stocking location 110 may supply a plurality of store locations 130 in a geographic area. In another example, a store location 130 may be supplied by a plurality of stocking locations 110 supplying different types of products and/or MMDs 105.

Figure 2:
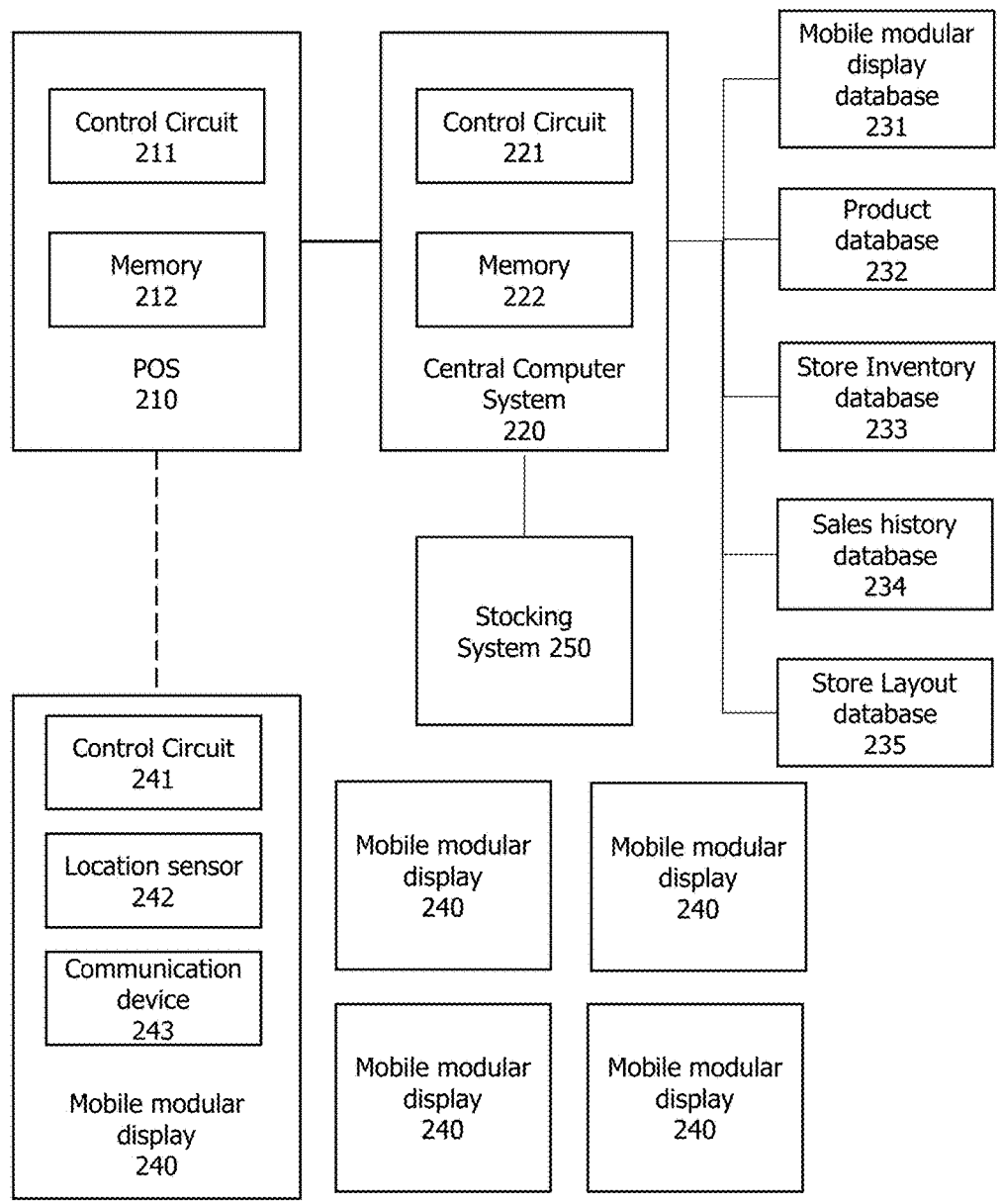
FIG. 2 is a block diagram of a system in accordance with several embodiments.

Referring now to FIG. 2, a system according to some embodiments is shown. The system includes a central computer system 220 coupled to a plurality of databases, a POS system 210, a stocking system 250, and a plurality of mobile modular displays (MMDs) 240.

The central computer system 220 comprises one or more processor-based device configured to manage the use of MMDs 240. In some embodiments, the central computer system 220 may comprise one or more of a computer device, a central computer bank, a server, a cloud-based server, and the like. The central computer system 220 comprises a control circuit 221 and a memory 222. The control circuit 221 may comprise a central processing unit, a processor, a microprocessor, and the like and be configured to execute computer readable instructions stored on the computer readable storage memory 222. The computer readable storage memory 222 may comprise volatile and/or non-volatile memory and have stored upon it a set of computer readable instructions which, when executed by the control circuit 221, causes the central computer system 220 to provide stocking instructions to the stocking system 250, transportation instructions, and/or store management instructions, based on the information retrieved from one or more the POS system 210, MMDs 240, and one or more databases. In some embodiments, the central computer system 220 may further be configured to track the inventory levels and/or statuses of the MMDs 240 in the system. In some embodiments, the central computer system 220 may be configured to select products to stock one or more MMDs 240. In some embodiments, the central computer system 220 may further be configured to determine the arrangement of products on one or more of the MMDs 240 and/or the arrangement of MMDs 240 at a store location. The specified arrangement of products and the arrangement of MMDs 240 in a store may generally be referred to as the store's layout and/or a planogram. In some embodiments, the central computer system 220 may be configured to perform one or more steps described with reference to FIGS. 4-7 herein.

The central computer system 220 may be coupled to one or more databases such as a mobile modular display database 231, a product database 232, a store inventory database 233, a sales history database 234, and a store layout database 235. In some embodiments, the mobile modular display database 231, the product database 232, the store inventory database 233, the sales history database 234, and the store layout database 235 may be implemented on one or more shared or separated computer readable memory devices. In some embodiments, one or more of the mobile modular display database 231, the product database 232, the store inventory database 233, the sales history database 234, and the store layout database 235 may be implemented on the memory 222 of the central computer system 220 and/or the memory 212 of the POS system 210.

The mobile modular display database 231 stores the statuses of the plurality of the MMDs 240 in the system. In some embodiments, each MMD 240 may be assigned a unique identifier and one or more status identifiers. In some embodiments, the unique identifier may be encoded in an optically readable code, a wireless beacon, a RFID tag, etc. on the MMD 240. In some embodiments, the system may track the locations of the each MMD 240 (e.g. at stocking location, at store A, at store B, in transit), the usage statuses of each MMD 240 (e.g. assigned, unassigned, waiting to be stocked, ready for transport, out of order, etc.), the capability of each MMD 240 (e.g. includes cooling unit, includes motorized wheels, capacity, dimension, etc.), current configuration of each MMD 240 (e.g. configured for garment display, decorated for holiday season, etc.), and the like. In some embodiments, the information stored in the MMD database 231 may be used by the central computer system 220 to select one or more MMD 240 to carry selected products to a store location. In some embodiments, the MMD database 231 may be used by the central computer system 220 to schedule and assign MMD servicing, cleaning, and/or configuration tasks. In some embodiments, the MMD database 231 may also track the on-shelf inventory for each of the MMDs 240. For example, MMD database 231 may store information on products assigned to each MMD and/or collect on-shelf inventory information from product sensors on the MMDs 240 to determine the identity and quantities of items being carried by each MMD 240. In some embodiments, the central computer system 220 may further use the MMD database 231 to determine when to retrieve an MMD 240 from a store and/or send a replacement MMD 240.

The product database 232 may store product information associated with a plurality of products offered for sale. In some embodiments, the product database 232 may store product dimensions and display requirement information. For example, headphones may require a 3-inches by 5-inches display space and a peg hanger type display structure. In another example, a soft drink product may require an MMD with a refrigerated unit. In some embodiments, the product database 232 may further store product category (e.g. snacks, dairy, household items, etc.) and/or attribute information (e.g. eco-friendly, organic, budget friendly, seasonal, perishable, etc.) associated with the products. In some embodiments, the product database 232 may comprise inventory information of a plurality of products at one or more stocking and/or storage locations. The information stored in the product database 232 may be used by the central computer system 220 to select products for a store location. For example, the system may estimate the demand for one or more products based on the product attributes, past sales history, and/or customer profiles of the customer base of the store location and select products that are likely to be in high demand at the store location. In some embodiments, the information stored in the product database 232 may further be used to select MMDs 240 for deployment and/or determine the arrangement of the products and the configuration of the selected MMD 240. For example, the central computer system 220 may determine the on-shelf arrangement of the products based on the size and display requirements of the selected products.

The store inventory database 233 may store the current inventory at one or more store locations. In some embodiments, the store inventory may comprise records of each product offered at a store location and the inventory quantity of each product. In some embodiments, the store inventory information may comprise inventory information associated each individual MMD 240 at the store location. In some embodiments, inventory information of each MMD 240 may be tracked by on-shelf product sensors. In some embodiments, the product sensors may comprise one or more of a RFID reader, an optical scanner, a camera, a weight sensor, a pusher, and the like. In some embodiments, the product sensors may further be configured to monitor for product condition using a temperature sensor, a moisture sensor, a chemical detector, a piezoelectric mat, and the like and record the product condition in the store inventory database 233. In some embodiments, the store inventory may be tracked by the POS system 210 based on sales data. For example, the system may deduct the inventory count of brand A chewing gum with each unit of brand A chewing gum sold through the POS system. The information stored in the store inventory database 233 may be used by the central computer system 220 to detect for modular display replacement conditions. In some embodiments, the central computer system 220 may detect for low in stock and/or out of stock conditions on one or more MMDs at a store location based on the store inventory database 233. In some embodiments, an MMD 240 may be replaced when one or more items on the shelf are low or out of stock. In some embodiments, the central computer system 220 may predict a likely low or out of stock condition based on sales trends of the one or more items and trigger MMD replacement based on the prediction. In some embodiments, the central computer system 220 may use the inventory information in the store inventory database 233 to select items to send to a store location on a replacement MMD 240. For example, the system may use the existing inventory of the store to estimate the demand for additional products send to the store.

The sales history database 234 stores sales history of one or more products at one or more store locations. In some embodiments, sales history may comprise sale rate (e.g. 2 units per day, 1 unit per hour, etc.) for one or more products. In some embodiments, sales history information may be separately tracked based on purchasing customer's demographic and other context information such as day of the week, season, holidays, upcoming events, weather, etc. In some embodiments, the central computer system 220 may use the information stored in the sales history database 234 to predict demand for one or more products and select products to send to store locations with MMDs 240. In some embodiments, the sales history database may further be used to determine the quantities of products to be carried on an MMD. In some embodiments, the central computer system 220 is configured to determine quantities for each product on an MMD such that each product is estimated to sell out around the same time. In some embodiments, the information in the product database 232, the store inventory database 233, and the sales history database 234 and context information may be used in combination to estimate demand for one or more products to determine the selection and quantity of products to include on one or more MMDs and/or determine MMD dressing configuration options. For example, if the assigned in-store location for an MMD is in a sunny area, the system may reduce lighting and increase cooling of the MMD. In another example, if a MMD is carrying seasonal items at the end of a season, the system may configure the MMD to raise lighting and change shelf labeling to draw attention and promote sell-through of the seasonal products.

The store layout database 235 stores planograms of one or more store locations. In some embodiments, planograms comprise arrangements of products on each of the MMDs 240 and the arrangement of MMDs 240 on the sales floor of the store location. In some embodiments, a planogram may be determined by the central computer system 220 based on the products on the MMDs 240, information in one or more of the databases, and/or other context information. In some embodiments, a store location may be assigned a plurality of planograms for different time periods. For example, when one or more replacement MMDs 240 are sent to a store location, the store location may be instructed to rearrange the MMDs 240 on the sales floor based on an updated planogram that includes the replacement MMDs 240. In another example, a daytime planogram may place MMDs with lunch items near the front of the store and a night time planogram may display snack items in the front. In some embodiments, the store layout database 235 may associate time periods with each of the one or more planograms. In some embodiments, the one or more planograms may further be associated with context information such as weather and events. In some embodiments, the central computer system 220 and/or the POS system 210 may be configured to verify that the placement of the MMDs 240 conforms to the layout for the store location stored in the store layout database 235. In some embodiments, the central computer system 220 and/or the POS system 210 may be configured to verify the arrangement of the products on MMDs 240 using the layout for the store location stored in the store layout database 235. In some embodiments, the central computer system 220 and/or the POS system 210 may be configured to generate an alert if a deviation from the specified layout is detected. In some embodiments, the central computer system 220 and/or the POS system 210 may allow for a transition time between layout changes before an alert is generated. For example, after an MMD 240 arrives at a location, the system may begin detecting for deviations 10 minutes after unloading the MMD 240. In some embodiments, store layout database 235 may be used by the system to provide navigation instructions to customers, automated transport devices, and/or associates based on the store layout determined for the store location.

The MMDs 240 comprise mobile display units configured to hold items for display on a sales floor. In some embodiments, the MMDs 240 are configured to be stocked with a plurality of types of products in a plurality of shelf spaces at a stocking location, transport the products to a store location, and display the products at the store location. The MMD 240 comprises a control circuit 241, a location sensor 242, and a communication device 243. In some embodiments, the control circuit 241 may comprise a central processing unit, a processor, a microprocessor, and the like and be configured to execute computer readable instructions stored on a computer readable storage memory. The computer readable storage memory may comprise volatile and/or non-volatile memory and have stored upon it a set of computer readable instructions which, when executed by the control circuit 241, causes the MMD 240 to determine its location based on the location sensor 242. In some embodiments, the location sensor 242 may comprise one or more of a wireless receiver, a Bluetooth receiver, a Wi-Fi receiver, an optical sensor, and a Radio Frequency Identification (RFID) tag. In some embodiments, the location sensor 242 may comprise an adjacency sensor configured to detect for the presence and/or proximity of other MMDs and/or architectural elements. In some embodiments, the control circuit 241 may further be configured to control one or more other components on the MMD such as lighting components, temperature control components, and digital signage. For example, the control circuit 241 may be configured to change the display of the digital signage and/or turn lights on or off based on communications with the POS system 210 and/or the central computer system 220.

In some embodiments, the control circuit 241 may communicate the location of the MMD 240 to the POS system 210 and/or the central computer system 220 via the communication device 243. In some embodiments, the communication device 243 may comprise a wireless transmitter such as one or more of a Wi-Fi adapter, a Bluetooth device, a RFID tag, a Near Field Communication (NFC) beacon, etc. In some embodiments, the communication device 243 may comprise a wired connection. In some embodiments, the communication device 243 and/or the location sensor 242 may comprise a coupler of the MMD 240. For example, the MMD 240 may be configured to couple with a docking structure on the sales floor of a store. The docking structure may comprise a data connection and/or a detector to collect identifying information from the location sensor 242 and/or the communication device 243 to determine the location of the MMD 240.

In some embodiments, the MMDs 240 may comprise a plurality of shelf spaces configured to hold a plurality of types of products in a specified arrangement during transport and display the plurality of types of products for customer selection and purchase on a sales floor of a store location. In some embodiments, an MMD 240 may comprise product sensors for monitoring the on-shelf inventory of the MMD 240. In some embodiments, the product sensors may comprise one or more of a RFID reader, an optical scanner, a camera, a weight sensor, a pusher, and the like. In some embodiments, the product sensors may further be configured to monitor for product condition using one or more of a temperature sensor, a moisture sensor, a chemical detector, a piezoelectric mat, and the like.

In some embodiments, an MMD 240 may comprise a coupler configured to couple with one or more of a store docking structure at the store location, another mobile modular display, a vehicle docking structure in a transportation vehicle, a unmanned ground vehicle (UGV), a conveyor system, and a securing structure at the stocking location. In some embodiments, the coupler may be configured to anchor and/or secure the MMD 240. In some embodiments, the coupler may comprise data and/or power ports. In some embodiments, an MMD 105 may comprise one or more temperature controlled compartments (e.g. refrigerated unit, freezer unit, heated unit). In some embodiments, the temperature control units may be powered by a battery and/or via a power connection to one or more of a stocking location, a transportation vehicle, a UGV, and a store location. In some embodiments, the MMDs 240 coupled together may be configured to form a power and/or data chain that allows the MMDs 240 to share data and/or power.

In some embodiments, an MMD 240 may comprise wheels configured to travel on the ground. In some embodiments, the wheel system may comprise retractable wheels that allow the bottom of the MMD housing to rest on the floor when retracted. In some embodiments, the wheel system may comprise wheels that may be locked to prevent the MMDs from rolling when displayed. In some embodiments, the wheels may comprise motored wheels. In some embodiments, an MMD 240 may further include steering controls for controlling the direction of the powered motors. In some embodiments, an MMD 240 may comprise a UGV configured to travel in a stocking location, a store location, and/or on a roadway between the stocking location and the store location based on navigation instructions.

In some embodiments, the MMDs 240 in a system may comprise a plurality of identical and/or interchangeable MMDs. In some embodiments, one or more MMDs may comprise specialized MMDs such as MMDs configure for display apparel items, MMDs with refrigerated units, MMDs configured for produce display, MMDs with locked compartments, etc. In some embodiments, one or more MMDs may comprise changeable and configurable modular parts. For example, an MMD 240 may comprise movable shelf dividers, movable shelf supports, removable hanger pegs, removable compartments, etc. In some embodiments, the MMDs 240 may further be configured to be "dressed" with signs and decoration. In some embodiments, an MMD 240 may comprise a label coupler configured to hold a shelf/pricing label. Further descriptions of embodiments of MMDs are provided with reference to FIG. 3 herein.

The stocking system 250 may comprise one or more of a conveyor system, store associate user interface devices, UGVs, and the like. In some embodiments, the stocking system 250 may be configured to transfer items from a storage system at a stocking location to MMDs 240 based on instructions from the central computer system 220. In some embodiments, the stocking system may comprise a plurality of associate user interface devices configured to display item picking and arrangement information. For example, the user interface device may display a pick list and/or a planogram for one or more MMDs to a stocking associate. In some embodiments, the stocking system 250 may comprise automated mobile units and/or conveyor systems configured to pick and/or stock MMDs 240 based on planograms selected by the system. In some embodiments, the stocking system 250 may further be configured to dress and configure MMDs 240 with attachments and/or decorations. For example, the stocking system 250 may be configured to print pricing labels and attach them to label couplers on the MMDs 240. In another example, the stocking system 250 may be configured to add or remove display structures such as shelf dividers, garment hangers, bars, peg hangers, locked shelves, etc. on the MMDs 240 during the stocking process.

In some embodiments, the stocking system 250 may generally be configured prepare an MMD 240 for deployment to a store location based on instructions received from the central computer system 220.

The POS system 210 generally refers to the computer system at a retail store location. In some embodiments, the POS system 210 may comprise one or more of a store management computer system, a checkout terminal, a self-service terminal, a virtual checkout system, etc. The POS system 210 comprises a control circuit 211 and a memory 212. The control circuit 211 may comprise a central processing unit, a processor, a microprocessor, and the like and be configured to execute computer readable instructions stored on the computer readable storage memory 212. The computer readable storage memory 212 may comprise volatile and/or non-volatile memory and have stored upon it a set of computer readable instructions which, when executed by the control circuit 211, causes the POS system 210 to track the overall inventory at a store locations, on-shelf inventory of one or more MMDs 240 at the store location, and/or locations of one or more MMDs 240 at the store locations. In some embodiments, the POS system 210 may be configured to monitor the on-shelf inventory of one or more MMDs 240 based on customer purchases. In some embodiments, the POS system 210 may communicate with product sensors on the MMDs 240 and/or sensors located elsewhere in the store location 130 to determine which items have been selected and/or purchased by customers. In some embodiments, purchases may be automatically charged to a customer's account when the customer exits the store location with the selected products. In some embodiments, the POS system 210 may be configured to monitor the placement of MMDs 240 to verify that the MMDs are arranged according to a planogram for the store location. In some embodiments, the POS system 210 may be configured to perform one or more functions of the central computer system 220 described herein. In some embodiments, the central computer system 220 may be configured to perform one or more functions of the POS system 210 described herein. In some embodiments, the POS system 210 and the central computer system 220 may be implemented on the same one or more devices and/or systems.

Figure 3:
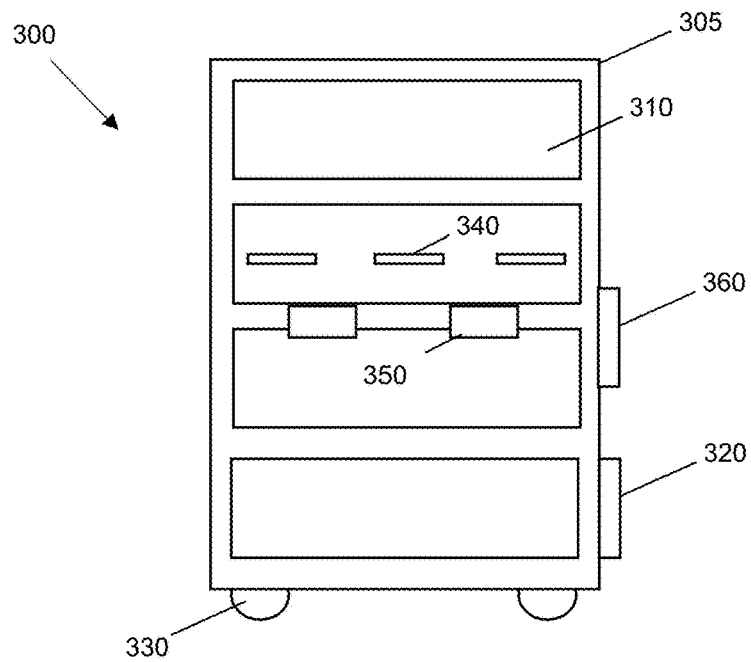
FIG. 3 is an illustration of a modular mobile display in accordance with several embodiments.

Referring now to FIG. 3, an illustration of a mobile modular display (MMD) is shown. The MMD 300 comprises a housing 305, a wheel system 330, a plurality of shelf spaces 310, a location device 320, a coupler 360, product sensors 340, and label couplers 350. The MMD may further comprise a control circuit (not shown) and a communication device (not shown).

In some embodiments, the housing 305 comprises a rigid material configured to be transported between a stocking center and one or more store locations multiple times and the plurality of shelf spaces comprises reusable spaces configured to hold different types of products each time the MMD is deployed to a store location. In some embodiments, the housing 305 may be configured to be a free-standing structure that may rest on the floor of the sales space to display products for sales. In some embodiments, the housing may comprise handles or notches for pulling and/or pushing the MMD 300.

The shelf spaces 310 generally comprises display spaces for holding products. In some embodiments, the shelf spaces 310 are configured to hold a plurality of types of products in a specified arrangement during transport and display the plurality of types of products for customer selection and purchase on a sales floor of a store location. In some embodiments, the plurality of shelf spaces 310 may comprise one or more removable and/or repositionable dividers, locked compartments, clothing hangers, greeting card slots, lawn and garden holders, gun racks, and the like. In some embodiments, one or more shelf spaces 310 may comprise temperature controlled storage compartments. In some embodiments, the housing 305 and/or the shelf space further comprises a clam shell door or a sliding door configured to secure products within the shelf spaces during transport. In some embodiments, one or more of shelf spaces comprises spring-loaded pushers configured to secure products in place during transport and display. In some embodiments, the shelf spaces 310 and products stored therein may be secured by one or more inflatable balloon casing during transport.

The location device 320 comprise a device configured to provide location information of the MMD 300. In some embodiments, the location device 320 comprises an adjacency sensor configured to detect for other MMDs to determine the location of the MMD 300. For example, adjacency sensors may be configured detect for the presence of each other to map out the relative locations of MMDs. In some embodiments, the location device 320 may be configured detect for architectural elements to determine the location of the MMD. For example, the location device 320 may comprise an optical sensor and/or a camera configured to the read an optically readable identifier on the floor and/or wall of the sales floor to identify the location of the MMD 300. In some embodiments, the location device 320 may comprise one or more of a wireless transceiver, GPS, a Bluetooth transceiver, a Wi-Fi transceiver, an optical sensor, and a Radio Frequency Identification (RFID) tag. In some embodiments, the location device 320 may be coupled to a wireless communication device configured to transmit the location of the housing to a central computer system. In some embodiments, the location device 320 may be combined with the coupler 360. For example, the MMD may be configured to dock with a docking structure on the sales floor of a store and/or a transportation vehicle. The docking structure of the store location and/or the vehicle may comprise a data connection and/or a detector to collect identifying information from the location device 320 to determine the location of the MMD 300. In some embodiments, the location device 320 may comprise the location sensor 242 described with reference to FIG. 2 herein or a similar device. The positioning of the location device 320 is provided as an example only. The location device 320 may be positioned on any portion of the MMD 300 without departing from the spirit of the present disclosure.

In some embodiments, the coupler 360 comprises a coupling structure configured to couple with one or more of a store docking structure, another mobile modular display, and a vehicle docking structure. In some embodiments, the coupler 360 is configured to anchor the MMD and prevent the MMD from shifting or tipping over. In some embodiments, the coupler 360 may comprise a power port configured to receive power from one or more of the store docking structure, another MMD, and the vehicle docking structure. In some embodiments, the coupler 360 may comprise a data port configured to communicate with one or more of the store docking structure, another MMD, and a transport vehicle. In some embodiments, a plurality of MMD coupled together may be configured to function as a power and/or data chain to share power and/or data with each other.

The wheel system 330 comprises one or more wheels configured to provide mobility to the MMD 300. In some embodiments, the wheel system comprises one or more motor-powered wheels. In some embodiments, the MMD 300 may comprise user steering controls for controlling the direction of the powered motors. For example, the MMD 300 may comprise a driving stick and/or a steering wheel configured to allow a store associate the control the movement of the MMD 300. In some embodiments, the powered wheels may be configured to provide power assist in the direction of push. In some embodiments, the MMD 300 may comprise a self-driving device and control circuit is configured to drive the motor-powered wheels and navigate the MMD based on navigation instructions. For example, the MMD 300 may be configured to receive a destination (e.g. a display location on the sales floor) from a remote computer system and use onboard sensors to navigate to the destination. In some embodiments, the wheel system 330 may comprise retractable wheels configured to retract and rest the bottom of the housing of the MMD on a floor of one or more of the store location, a transportation vehicle, and an MMD stocking center. In some embodiments, the MMD 300 may be configured to unload itself from a transportation vehicle and park itself at a designated display location on a sales floor to display items for sale. At the time of retrieval, the MMD 300 may be configured to drive itself to a transportation vehicle to be transferred back to a stocking location.

The product sensor 340 may comprise sensors configured to monitor on-shelf inventory of the MMD 300. In some embodiments, product sensors 340 may comprise one or more of a Radio Frequency Identification (RFID) reader, an optical sensor, a camera, an optical light curtain, a weight sensor, and a mechanical pusher device. In some embodiments, the product sensors may further be configured to monitor for product condition using one or more of a temperature sensor, a moisture sensor, a chemical detector, a piezoelectric mat, and the like. In some embodiments, the product sensor 340 may comprise inventory trackers configured to provide item count data to a central computer system and/or a POS system. In some embodiments, the MMD 300 may comprise a control circuit configured to track inventory levels of products in the plurality of shelf spaces based on the one or more product sensors 340 and communicate the inventory information to a POS system and/or a central computer system via a communication device.

In some embodiments, the product label couplers 350 are configured to hold product labels such as identification labels, pricing labels, and promotional labels. In some embodiments, the product label coupler 350 may be configured to hold labels for products placed in corresponding shelf spaces during transport and present the labels to customers on the sales floor of the store location. In some embodiments, the product label couplers 350 may comprise reprogrammable digital display devices. In some embodiments, the MMD 300 may comprise couplers for other types of "dressing" and/or decoration. For example, vertical banners, seasonal decorations, and promotional items may be attached to the MMD at a stocking location and transported to a store location for display.

The illustration of the MMD 300 is provided as an example only. The locations, sizes, and appearances of one or more of the shelf spaces 310, the location device 320, the wheel system 330, the product sensor 340, the product label couplers 350, and the coupler 360 may vary without departing from the spirit of the present disclosure. In some embodiments, one or more of the shelf spaces 310, the location device 320, the wheel system 330, the product sensor 340, the product label couplers 350, and the coupler 360 may comprise optional components of the MMD 300 and may be absent in at least some MMDs 300. In some embodiments, one or more of the shelf spaces 310, the location device 320, the wheel system 330, the product sensor 340, the product label couplers 350, and the coupler 360 may comprise removable and/or reconfigurable components of the MMD 300.

Figure 4:
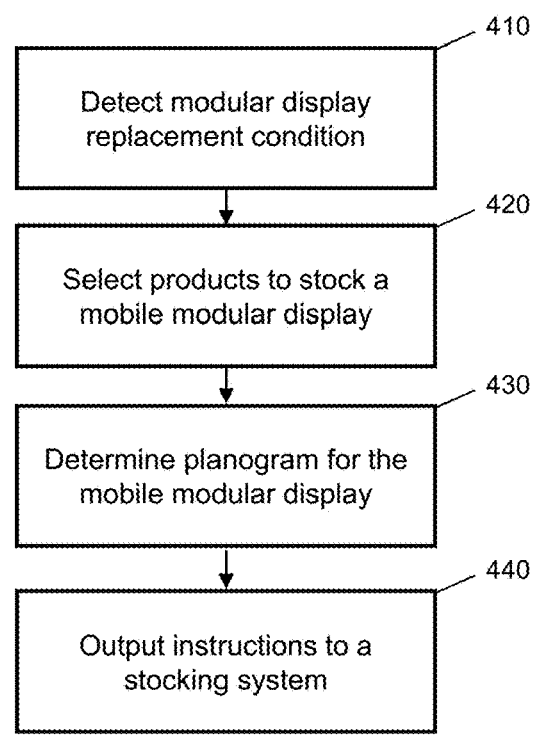
FIG. 4 is a flow diagram of a method in accordance with several embodiments.

Referring now to FIG. 4, a method for supplying a store is shown. Generally, the method shown in FIG. 4 may be implemented with one or more processor-based devices such as devices having a control circuit, a central processor, a microprocessor, and the like. In some embodiments, one or more steps in the method shown in FIG. 4 may be implemented with the central computer system 112, the POS system 132, the central computer system 220, the POS system 210, the mobile modular display 240, the stocking system 250, an associate user interface device, and/or similar devices.

In step 410, the system detects a modular display replacement condition at a store location selling products on a plurality of deployed MMDs. In some embodiments, MMDs are configured to be stocked with a plurality of types of products in a plurality of shelf spaces at a stocking location, transport the products to a store location, and display the products at the store location. In some embodiments, prior to step 410, the system may be configured to monitor the inventory levels of one or more store locations and/or one or more MMDs to determine whether to trigger a modular display replacement.

In some embodiments, the modular display replacement condition may be detected based on the inventory information of a store location and/or inventory level of individual MMDs at the store location. In some embodiments, the modular display replacement condition comprises one or more: a quantity of one or more products on the at least one mobile modular display falling below a threshold, a quantity of all products on the at least one mobile modular display falling below a threshold, and a sales rate of one or more products on the at least one mobile modular display falling below a threshold. In some embodiments, modular replacement condition may be determined based on the overall inventory of an MMD. For example, replacement may be triggered for an MMD when less than 20% of products remains on the MMD, regardless of the individual inventory levels of different items on the MMD. In some embodiments, modular replacement may be triggered when any one or more products on an MMD is low or out of stock. For example, replacement may be triggered when one product only has 2 units left on the shelf and is expected to sell out by the end of the day, regardless of the inventory levels of other products on the same MMD. In some embodiments, modular display replacement may be triggered when one or more items is estimated to sell out around the arrival of the next scheduled shipment of MMDs to the store location. In some embodiments, modular display replacement may be triggered if the sales rate of an item increases beyond a threshold and/or fall below a threshold. For example, if one or more products on an MMD has not sold for a period of time (e.g. 2 days, 1 week), a modular replacement condition may be triggered to replace the MMD, even though there is sufficient on-shelf inventory. In some embodiments, modular replacement condition may be triggered with the expiration of one or more perishable products and/or the passing a promotional period for seasonal products. For example, after Halloween, the system may begin to replace MMDs displaying Halloween candies.

In step 420, the system selects products to stock a replacement MMD. In some embodiments, the MMD being replaced may be associated with the modular display replacement condition detected in step 410. In some embodiments, the system may be configured to select a plurality of products to stock an MMD from the plurality of mobile modular displays for the store location based on the sales history of the store location stored in the sales history database and a current inventory of the store location stored in the store inventory database. In some embodiments, sales history database and store inventory database may comprise the sales history database 234 and the store inventory database 233, respectively, described with reference to FIG. 2. In some embodiments, the sales history may be used to estimate future demand for one or more products. In some embodiments, the plurality of products may be further selected based on customer information associated a customer base of the store location and/or product information stored in a product database. For example, the system may predict demand for new products not previously sold at a store location based on the customer base demographic, preference, affinity, partiality, and aspiration information stored in a customer database and associated product characteristics stored in the product database. In some embodiments, the system may select products with high estimated demands based on customer, sales, and product information. In some embodiments, the products may be selected in view of the current inventory of the store locations. For example, the system may estimate future demands for additional units of a product based on the current unit count of the same or similar products at the store location. In some embodiments, the products are further selected based on one or more of date, event, and weather information. For example, if a storm is coming, the system may stock an MMD with umbrellas to increase the total number of umbrellas carried at a store location. In some embodiments, the system may further determine the quantity for each of the plurality of products based on estimated sale rates of each of the plurality of products and a capacity of the mobile modular display. For example, more units of a fast selling product may be selected over a lower selling. In another example, the system may use the recorded sizes information of the products to ensure that the products selected for an MMD do not exceed the capacity of the MMD. In some embodiments, the stock quantity of each of the plurality of products is determined such that the plurality of products on the mobile modular display are estimated to sell out at approximately the same time. For example, if brand C candy bar is estimated to sell 8 units a day and brand D chewing gum is estimated to sell 4 units a day, the system may place twice as many brand C candy bars on the MMD as compared to brand D chewing gum on the same MMD. In some embodiments, the system may select products and determine product quantities to meet the estimated customer demand, increase sales, fully utilize the MMD's shelf space, and/or minimize a number of residual products on the MMD when the MMD is retrieved from the store location.

In some embodiments, after step 410, the system may further select an MMD to replace the deployed MMD associated with the modular display replacement condition. In some embodiments, the MMD may be selected based on one or more of the types of products selected for the store location, the display requirements of the products, the capability of the MMD (e.g. refrigerated unit, heavy duty housing, etc.), the availability of the MMD, the dimension of the MMD, and/or the current configuration of the MMD (e.g. position of removal shelf dividers, garment display attachments, etc.). In some embodiments, the system may select an available MMD suitable for the display location at the store and compatible with the products selected for the store.

In step 430, the system determines a planogram for the plurality of products selected for the mobile modular display. The planogram generally refers to the layout of products on a display and/or the arrangement of displays in a store. In some embodiments, the system may further select an in-store display location for the mobile modular display at the store location based on a current layout of the store location and/or products carried on each of the MMDs. In some embodiments, the system may update the layout of the store based on the additional and/or replacement of one or more MMDs. In some embodiments, the arrangement of products on an MMD and/or the arrangement of the MMDs on a store sales floor may be determined based on one or more of the products carried by each MMD, sales trend, date, event, and weather information. In some embodiments, the arrangement of products on an MMD may be based on one or more of the relative popularity of the products, the fragility of the products, the display structure types associated with each product, the weight for each product, etc. In some embodiments, the system may specify a shelf space (e.g. top shelf, second shelf) for each product selected for an MMD and the amount of space allotted for each product (e.g. 3 rows, 10 inches, etc.). In some embodiments, the system may further be configured to select dressing and/or configuration options for MMDs. In some embodiments, dressing configuration for an MMD may comprise one or more of signage configuration, label configuration, lighting configuration, temperature setting, and security options.

In step 440, the system outputs an instruction to a stocking system to stock the mobile modular display with the plurality of products in the plurality of shelf spaces according to the planogram and to transport the MMD to the store location for display. In some embodiments, the stocking system may comprise one or more of a conveyor system, associate user interface devices, UGVs, and the like. In some embodiments, the stocking system may be configured to transfer items from a storage system at a stocking location to the selected MMD. In some embodiments, the stocking system may comprise a plurality of associate user interface devices configured to display item picking instructions and/or product arrangement information. For example, a user interface device may display a pick list and/or a planogram for and MMD to an associate. In some embodiments, the stocking system may comprise automated units configured to pick items from the storage system and stock MMDs based on a planogram. In some embodiments, the system may be configured to determine and output dressing instructions to the stocking system to prepare the MMD according to the dressing configurations. For example, the stocking system may be configured to print pricing labels and attach them to label couplers on the MMDs. In another example, the stocking system may be configured add or remove display structures such as shelf dividers, garment hangers, bars, peg hangers, locked shelves, etc. on the MMDs during the stocking process. In some embodiments, the stocking system may comprise the stocking system 250 and/or the central computer system 220 described with reference to FIG. 2 or similar systems.

After step 440, in some embodiments, the process may return to step 410 and the system may prepare additional MMDs for one or more store locations. In some embodiments, after step 440, the system may be configured to inspect the prepared MMD to verify that the MMD conforms with the product arrangement and/or dressing options determined in step 430. For example, the system may capture images of the prepared MMD and compare the captured image to the planogram selected for the MMD.

In some embodiments, an MMD prepared in step 440 may be loaded onto a transport vehicle and transported to a store location. In some embodiments, the MMD may replace the at least one of the plurality of deployed mobile modular displays on a sales floor of the store location. When the MMD meets the modular display replacement condition, steps 410-440 may be repeated to replace the MMD with a yet another stocked MMD from the stocking location.

Figure 5:
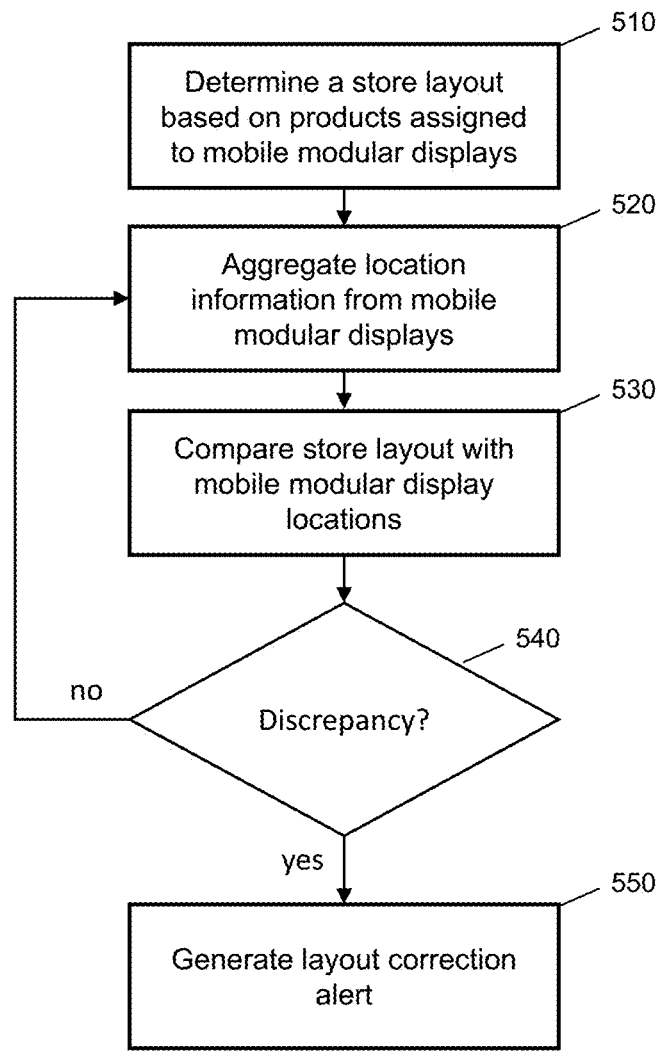
FIG. 5 is a flow diagram of a method in accordance with several embodiments.

Referring now to FIG. 5, a method for managing a store is shown. Generally, the method shown in FIG. 5 may be implemented with one or more processor-based devices such as devices having a control circuit, a central processor, a microprocessor, and the like. In some embodiments, one or more steps in the method shown in FIG. 5 may be implemented with the central computer system 112, the POS system 132, the central computer system 220, the POS system 210, the mobile modular display 240, the stocking system 250, an associate user interface device, and/or similar devices.

In step 510, the system determines a store layout of a store location. In some embodiments, the store layout comprises in-store locations for a plurality of mobile modular displays assigned to the store location. In some embodiments, the store layout may comprise a planogram of the store. In some embodiments, a planogram and/or a layout of a store comprises arrangements of products on each of the MMDs and the arrangement of MMDs on the sales floor of the store location. In some embodiments, the store layout may be determined based on products selected for MMDs assigned to the store location. In some embodiments, the layout may be determined further based on the inventory of the store, estimated demand of one or more products carried by each MMD, sales trend, date, event, weather information, and/or other context information. For example, popular items may be placed near the register and/or front of the store. In some embodiments, when the system detects a modular display replacement condition, the system may determine a new store layout based on products assigned to the one or more replacement MMDs and update the store layout of the store location stored in the store layout database with the new store layout. In some embodiments, the store layout may be stored into and/or retrieved from a store layout database storing the planograms of one or more store locations. In some embodiments, a store location may be associated with a plurality of planograms for different time periods. For example, when one or more replacement MMDs are sent to a store location, the store location may be instructed to rearrange the MMDs on the sales floor based on an updated planogram with the arrival of the replacement MMDs. In another example, a daytime planogram may place MMDs with lunch items near the front of the store and a night time planogram may display snack items in the front. In some embodiments, the store layout database may specify time periods associated with each of the one or more planograms.

In some embodiments, after step 510, the layout of the store may be accessed by the store location to place and/or arrange the MMDs. In some embodiments, the system may further provide navigation instructions to customers, autonomous transport vehicles, and/or associates based on the store layout determined for the store location. For example, an autonomous transport device may be configured to couple to an MMD and transfer the MMD to the MMD's assigned display location based on the store layout and/or navigation instructions. In another example, the store layout may be used to generate a customer user interface. The customer may browse and search the locations of products at a store location via the user interface. In some embodiments, the store layout customer user interface may comprise an in-store kiosk and/or a mobile application.

In step 520, the system aggregates location information from the mobile modular displays on display in the store location. In some embodiments, the location of the MMDs may be determined based on location sensors on the MMDs such as the location sensor 242 described with reference to FIG. 2 and/or the location device 320 described with reference to FIG. 3 herein. In some embodiments, the location information of MMDs may be determined based on adjacency sensors configured to detect for presences of other mobile modular displays. For example, an MMD may be configured to determine its location relative to one or more MMDs next to it based on the adjacent sensor. In some embodiments, the location information of the plurality of MMDs may be detected by one or more location devices comprising one or more of a wireless transceiver, a Bluetooth transceiver, a Wi-Fi transceiver, an optical sensor, a camera, and a Radio Frequency Identification (RFID) tag. In some embodiments, MMDs may be configured to dock with one or more docking structures at the store location and the location information may be detected based on sensors on the one or more docking structures. In some embodiments, the location information may be determined based on detecting for architectural elements on the sales floor of the store location. For example, the floor of the store may comprise a numbered grid, and a camera on the MMD may be configured to capture an image of the floor below the MMD to determine its location. In some embodiments, the locations of the MMD may be determined by an external location sensor such as a handheld scanner, a scanner on an automated unit, wall mounted or ceiling mounted sensors, and wireless transceivers. For example, a unique identifier may be printed on top of each MMD and a ceiling mounted camera may capture images of the tops of the MMDs to aggregate the locations of the MMDs. In some embodiments, the system may further determine the orientation (e.g. facing north, south, etc.) based on the location sensor.

In step 530, the system compares the store layout associated with the store location in the store layout database and the location information of the mobile modular displays aggregated in step 520. In some embodiments, the system may select a layout from a plurality of layouts associated with a store location based on time and/or other context information. In some embodiments, the system may be configured to compare the locations for each MMD as designated in the store layout and/or planogram and the actual locations of the MMDs as determined in step 520. In some embodiments, steps 520 and 530 may be repeated periodically to ensure compliance to the store planogram. In some embodiments, the store layout associated with the store location and the location information of the plurality of MMDs may be compared in response to detecting an addition of a replacement mobile modular display at the store location and/or a removal of one or more of the MMDs.

In step 540, the system determines whether there is a discrepancy between the store layout determined in step 510 and the location information aggregated in step 520. In some embodiments, discrepancy may comprise differences in a MMD's location coordinate, an MMD's location relative to each other, an MMD's location relative to the store's architectural elements, and/or an MMD's orientation. If no discrepancy is detected, the system may return to step 520 and continue to monitor the MMD locations in a store.

If a discrepancy is detected in step 540, the system may generate a layout correction alert in step 550. In some embodiments, a layout correction alert may comprise an instruction to relocate a mobile modular display, switch two mobile modular displays, remove a mobile modular display, or locate a missing mobile modular display. In some embodiments, the system may display correction alert and/or instructions on an associate user interface. For example, the user interface may highlight the MMDs that are misplaced in a diagram of the store layout. In some embodiments, the display correction alert may be displayed via an indicator (e.g. LED light, display screen) on the MMD associated with the error. For example, if a MMD is misplaced, the system may cause a LED light on the MMD to start blinking to indicate the error. In some embodiments, the system may provide machine instructions to an automated unit to assign an MMD rearrangement task to the automated unit. In some embodiments, the system may repeat steps 520-550 until the detected discrepancy is addressed.

In some embodiments, step 540 may be suspended during a layout transition period. For example, the store location may be given 10 minutes after the arrival of a group of newly stocked MMDs to modify the layout of the store based on a new planogram determined with the new MMDs. In some embodiments, the system may further be configured to detect for other irregularities in the shopping space such as damages to products, damages to MMDs, spills, etc. and instruct corrective actions to associates and/or automated units. In some embodiments, step 510 may comprise step 430 described with reference to FIG. 4. In some embodiments, steps 520-550 may occur after one or more MMDs prepared according to steps 410-440 arrives at a store location.

Figure 6:
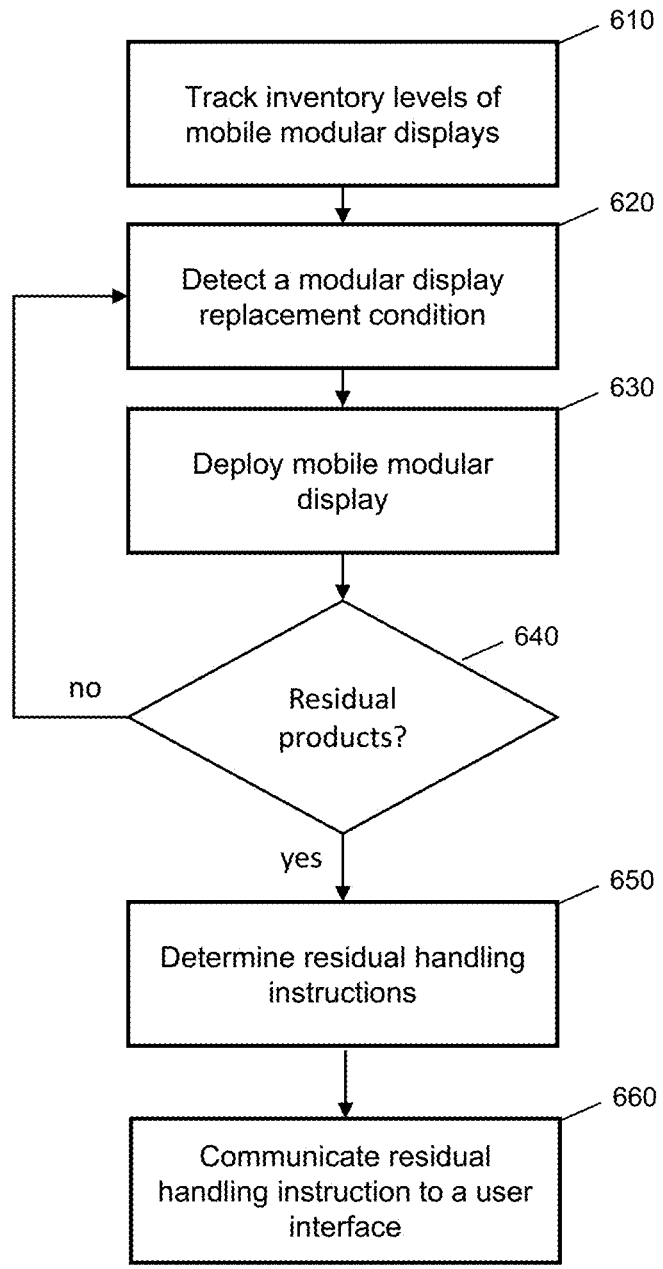
FIG. 6 is a flow diagram of a method in accordance with several embodiments.

Referring now to FIG. 6, a method for handling residual products is shown. Generally, the method shown in FIG. 6 may be implemented with one or more processor-based devices such as devices having a control circuit, a central processor, a microprocessor, and the like. In some embodiments, one or more steps in the method shown in FIG. 6 may be implemented with the central computer system 112, the POS system 132, the central computer system 220, the POS system 210, the mobile modular display 240, the stocking system 250, an associate user interface device, and/or similar devices.

In step 610, the system tracks inventory levels of mobile modular displays in a store location. In some embodiments, MMDs are configured to be stocked with a plurality of types of products in a plurality of shelf spaces at a stocking location, transport the products to a store location, and display the products at the store location. In some embodiments, the inventory levels are tracked in the mobile modular display inventory database and/or a store inventory database. The inventory database may store the current inventory information of individual MMDs at one or more store locations. In some embodiments, the MMD inventory information may comprise records of each product offered at a store location and the inventory quantity of each product. In some embodiments, the inventory levels are tracked by one or more product sensors on one or more of the MMDs and/or a POS system of the store location. In some embodiments, product sensors may comprise one or more of a RFID reader, an optical scanner, a camera, a weight sensor, a pusher, and the like. In some embodiments, the sensors may be configured to detect for the removal and/or additional of products on the shelves of an MMD. In some embodiments, the sensors may be configured to count the number of products on the shelves of the MMD. In some embodiments, the store inventory may be tracked by a POS system based on sales made through the POS system. For example, the system may deduct the inventory count of brand A chewing gum with each unit of brand A chewing gum sold through the POS system.

In step 620, the system detects a modular display replacement condition at a store location selling products on a plurality of deployed MMDs. In some embodiments, the modular display replacement condition may be determined based on the inventory levels of the MMDs at the store location tracked in step 610. In some embodiments, the modular display replacement condition may comprise one or more: a quantity of one or more products on the at least one mobile modular display falling below a threshold, a quantity of all products on the at least one mobile modular display falling below a threshold, and a sales rate of one or more products on the at least one mobile modular display falling below a threshold. In some embodiments, the modular display replacement condition may be detected based on the inventory information of a store location and/or inventory levels of individual MMDs at the store locations. In some embodiments, modular replacement may be triggered when one or more products on an MMD is low or out of stock. For example, replacement may be triggered when one product only has 2 units left on the shelf and is expected to sell out by the end of the day, regardless of the inventory levels of other products on the same MMD. In some embodiments, modular replacement condition may be determined based on the overall inventory of an MMD. For example, replacement may be triggered for an MMD when less than 10% of products remains on the MMD, regardless of the individual inventory levels of different items on the MMD. In some embodiments, modular display replacement may be triggered when any one or more items is estimated to be sold out at a specified time, such as around the next scheduled shipment of MMDs to the store location. In some embodiments, modular display replacement may be triggered if the sales rate of an item increases beyond a threshold and/or fall below a threshold. For example, if one or more products on an MMD has not sold for a period of time (e.g. 2 days, 1 week), a modular replacement condition may be triggered to replace the MMD even though there is sufficient on-shelf inventory. In some embodiments, modular replacement condition may be triggered with the expiration of one or more perishable product and/or the passing a promotional period of seasonal products. For example, after Halloween, the system may begin to replace MMDs displaying Halloween candies. In some embodiments, step 620 may comprise step 410 described with reference to FIG. 4 herein.

In step 630, the system deploys one or more replacement MMDs to the store location. In some embodiments, the MMD is deployed to replace the at least one mobile modular display on at a sales floor of the store location in response to detecting the modular display replacement condition. In some embodiments, the replacement MMD may be stocked with products to be displayed and sold at the store location. In some embodiments, the replacement MMD may be prepared according to steps 410-440 described with reference to FIG. 4 or a similar process. In some embodiments, the replacement MMDs may be deployed to replace one or more MMDs currently displaying products on the sales floor of the store location. In some embodiments, the replacement MMDs may be loaded on a transportation vehicle and transported to a store location.

In step 640, the system determines whether the MMDs being replaced contains residual products. In some embodiments, whether residual products are present may be determined based on product sensors and/or a POS system of the store location. In some embodiments, whether residual products are present and/or expected to be present at the time of replacement may be determined based on the inventory of the MMDs tracked by the system. In some embodiments, step 640 may be based on a prediction of the inventory level of the replaced MMD being replaced at the time the replacement MMD is prepared. In some embodiments, step 640 may be based on the actual inventory level of the MMD being replaced at the time the MMD is being removed from the sales floor.

In the event that no residual product remains on the MMD, the empty MMD is transported back to the stocking location for subsequent uses, and the process returns to step 620. In the event that residual products remains on the MMD or is predicted to remain on the MMD being replaced, the process proceeds to step 650. In step 650, the system determines residual handling instructions for MMDs with residual products. In some embodiments, residual handling instructions may be selected from a plurality of residual handling methods for the residual products. In some embodiments, the residual handling instruction may be selected based on one or more of residual product type, residual product quantity, residual product condition, residual product sales history, products displayed on other mobile modular displays at the store location, and products assigned to be transported to the store location with the replacement mobile modular display. In some embodiments, the residual handling instruction comprises returning the residual products to a mobile modular display stocking center with the at least one mobile modular display being replaced. For example, the store location may load the MMD back on a transportation vehicle without removing the residual products. The residual products may then be removed at the stocking to be restocked, repurposed, and/or discarded. In some embodiments, the residual handling instruction comprises relocating the residual products to another modular display at the store location prior to returning the at least one mobile modular display to a mobile modular display stocking center. For example, the system may instruct the consolidation of products on two or more partially emptied MMDs. In some embodiments, the residual handling instruction comprises moving the at least one mobile modular display to a backroom storage area at the store location and using the residual products to restock other mobile modular displays on the sales floor of the store location. For example, the MMD may function as temporary storage in a backroom area of the store location and may be retrieved at a later time. In some embodiments, the residual handling instruction comprises moving the residual products to the replacement mobile modular display when the replacement mobile modular display arrives at the store location. In some embodiments, the stocking location may be configured to select a plurality of products to stock the replacement mobile modular display and leave room for the residual products on the shelve spaces of the replacement mobile modular display.

In step 660, the system communicates the residual handling instruction to a user interface device. In some embodiments, the user interface device may comprise a store associate user interface device and/or an automated unit configured to move products and/or MMDs in the store. In some embodiments, the residual handling instruction may comprise instructions to move products from one MMD to another, move the MMD to a backroom area, and/or load the MMD to a transportation vehicle to return to a stocking location. In some embodiments, the steps in FIG. 6 may be repeated each time MMDs are replaced on a sales floor of a store location. In some embodiments, handling instructions for MMDs being replaced with the same shipment of replacement MMDs to a store location may be separately determined. For example, residual products may be removed from one MMD but not the others being transported back to the stocking location on the same transportation vehicle.

Figure 7:
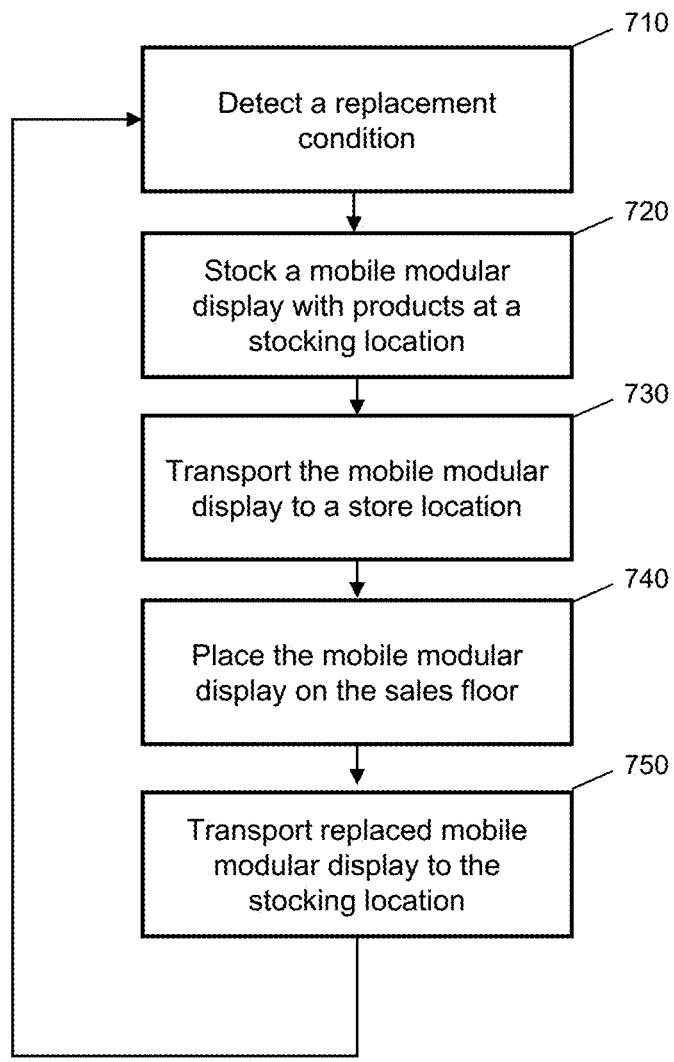
FIG. 7 is a flow diagram of a method in accordance with several embodiments.

Referring now to FIG. 7, a method for using mobile modular displays is shown. Generally, the method shown in FIG. 7 may be implemented with one or more processor-based devices such as devices having a control circuit, a central processor, a microprocessor, and the like. In some embodiments, one or more steps in the method shown in FIG. 7 may be implemented with the central computer system 112, the POS system 132, the central computer system 220, the POS system 210, the mobile modular display 240, the stocking system 250, an associate user interface device, and/or similar devices.

In step 710, the system detects a replacement condition associated with one or more MMDs at a store location. In some embodiments, step 710 may comprise step 410 described with reference to FIG. 4 and/or step 610 described with reference to FIG. 6 herein. In some embodiments, an MMD may be replaced at a store location when it is low in stock or out of stock. In some embodiments, an MMD may be replaced if the products on the MMD is no longer projected to have high demand.

In step 720, MMDs are stocked with products at a stocking location. In some embodiments, the system may select products and determine an arrangement of products on the MMD. In some embodiments, the product and product arrangements may be selected based on steps 420 and 430 described with reference to FIG. 4 and/or step 510 described with reference to FIG. 5. In some embodiments, MMDs may be stocked with the stocking system 250 described with reference to FIG. 2 a similar system. In some embodiments, the system may further determine dressing options for the MMD and the stocking system may be configured to dress the MMD accordingly in step 720.

In step 730, MMDs are transported to a store location. In some embodiments, the MMDs may be transported by transport vehicles such as the transportation vehicle 120 described with reference to FIG. 1. In some embodiments, the MMDs may comprise unmanned ground vehicles (UGVs) configured to travel between stocking locations and store locations. In some embodiments, the MMDs may be transported while fully stocked and/or dressed. In some embodiments, the MMD may be configured to be coupled to the transport vehicle's power supply to power/charge one or more devices on the MMD.

In step 740, a deployed MMD is placed on the sales floor. In some embodiments, new MMD may be placed at a display location specified by a planogram determined by the system. In some embodiments, the store layout may be determined based on step 510 described with reference to FIG. 5 or a similar step. In some embodiments, after the MMD is placed on the sales floor, the system may verify the placement based on the process described with reference to FIG. 5 or a similar process. In some embodiments, the MMD may be anchored to other MMDs and/or a docking structure at the store.

In step 750, the replaced MMD is transported back to the stocking location. In some embodiments, the residual products on the replaced MMD may be handled according to the steps described with reference to FIG. 6 or similar steps prior to being transported. In some embodiments, the MMD may be kept in a storage area at the store location temporarily before being transported back to the stocking location. The returned MMD may then be used to supply the store location or a different store location with different products according to steps 710-740 at a later time.

In some embodiments, the methods and system described herein provide shelving systems that are pre-stocked prior to shipment to a retail store. These shelf systems may be stocked at a manufacturer or distribution center and loaded into modular containers. In some embodiments, each modular container stores one or more mobile shelf systems and each modular container may be intended for delivery to a single store. In some embodiments, a single delivery vehicle may carry multiple modular containers intended for a single store or for multiple stores. In some embodiments, the module containers may be removed from the delivery vehicle through rollers and/or wheels on the modular containers at the store location. In some embodiments, one or more shelf systems may be configured to be easily removed from the modular containers through wheels on the shelf systems. The shelf systems that are preloaded with products for purchase may be staged and moved onto the sales floor to replace one or more other shelf systems on the sales floor. In some embodiments, each shelf system includes multiple shelves to support one or more types of products and the shelf systems arrive at the store fully loaded with products and ready for to be placed on the sales floor. In some embodiments, the shelf systems may further include couplers that allow two or more shelf systems to be coupled together (e.g., to form a row in a store and/or a train-like arrangement for transport through the distribution center and/or a store). In some embodiments, shelf systems may comprise MMDs described herein.

In some embodiments, products may be stocked to meet needs (demand) for each individual store based on factors such as forecast, events, weather, time of year, current store layout, etc. In some embodiments, products may be given space on the MMD based on a projected sell-through rate for each item on the shelf such that the entire MMD may be empty or near empty when it is replaced with a new MMD. In some embodiments, MMDs may be moved to different locations in the store to support store events or promotions. For example, MMDs with beach towel and pool noodles may be moved outside of the store to better display merchandise during hot weather.

In some embodiments, an MMD may include RFID or similar technology for identifying the locations of each MMD in each store. In some embodiments, locations of MMD may be used to collect product sales rate information at various display locations. In some embodiments, MMD location information may further be used to confirm modular integrity and conformity to the store planogram.

In some embodiments, an MMD may be motorized for movement in the store location and/or stocking location. The motor of an MMD may assist in the moving MMDs stocked with merchandise that may be extremely heavy (e.g. canned soup). In some embodiments, an MMD may comprise a balloon type air displacement casing to secure products during transportation. The balloons may be filled with air to lock-in/hold merchandise in place during transportation between a store location and a stocking location.

In some embodiments, products may be displayed on more than one MMDs concurrently to reduce the chance of any one MMD appearing out of stock. In some embodiments, the system may be configured to detect a modular display replacement condition based on individual modular stock levels such that when the inventory of a specific MMD or shelf drops below a threshold for one or more products and/or the shelves approach out of stock condition, a replacement is triggered. In some embodiments, current inventory of individual MMDs may be determined manually or automatically with sensors. In some embodiments, a replacement MMD may be sent to a store location with empty space to be filled with residual products from another MMD being removed from the store sales floor. In some embodiments, the replaced MMD may be cleaned and returned to the supply facility for restocking.

In some embodiments, an MMD may be configured to dock with an autonomous and/or unmanned vehicles (e.g. UGV) for transport. In some embodiments, a vehicle may be configured to provide power to the MMD during transportation. In some embodiments, the MMD may comprise temperature controlled (hot/cold) compartments, have lights, include signage, and/or include shelf labels. In some embodiments, one or more temperature controlled compartments, lights, signage, and/or shelf labels may be added to the MMD at the stocking location. In some embodiments, an MMD may comprise docking/coupling structures that include power and/or data ports configured to allow data and/or power to flow from one MMD to another MMD. In some embodiments, an MMD may comprise a machine readable identifier (e.g. RFID tag, barcode, etc.) used for tracking, managing, and/or locating the MMDs. In some embodiments, the placement of MMDs may be automatically validated by the system using electronic identifiers on the MMDs.

In some embodiments, the system may further be configured to manage the dressing of MMDs. In some embodiments, dressing an MMD may include one or more of applying shelf labels, lighting, signage, promotional signs, and advertisements. In some embodiments, the stocking system may service the MMD prior to deployment. For example, the stocking system may tune the sensors for the products or location, clean the MMD, and/or perform repairs. In some embodiments, the placement of products on an MMD may further be determined based co-location or arrangement of products and arrangement of competitive/similar products (e.g. store brand products, complimentary products). In some embodiments, the system may be configured to select the appropriate dressing from a database containing modular plans and product display requirements, apply the selected settings through an interface, and validate the prepared MMD through the system. In some embodiments, dressing options may be shared between adjacent MMDs. For example, MMDs arranged to be placed next to each other may be dressed to include collaborative lighting, split signage, etc. In some embodiments, dressing the MMD may comprise loading data onto electronic labels, setting the temperatures for temperature controlled units, setting the locks or security codes for high security units, and/or applying anti-theft components. In some embodiments, the dressing of an MMD may include providing a display (e.g. labeling, e-paper, led displays) of the alternate products locations for out of stock products.

In some embodiments, the store layout of a store location may be used to provide navigation instructions to customers, associates, and/or autonomous vehicles. In some embodiments, the navigation instructions may be provided via a user interface such as one or more of user devices, web application, kiosk, central computer, inter-modular user interface devices, and autonomous vehicles. In some embodiments, the locations of the MMDs may be determined using architectural features as a reference and by comparing distances/coordinates with a blueprint model of the store. In some embodiments, the system may be configured to provide travel and/or navigation instructions to unmanned vehicles transporting MMDs and/or products.

In some embodiments, store layout may be updated in response to broader reconfigurations related to events or seasonal changes. MMD locations may then be reassigned and the display location of an incoming MMD placement may be determined to align with the new layout plan. The validation of MMD placement may also be based on revised current layout. In some embodiments, the system may track the progress and status of reconfigurations. For example, based on the current locations of MMDs, the system may determine that the store layout is 50% transitioned from a Thanksgiving layout to a Christmas layout. In some embodiments, the system may comprise one or more sensors (e.g. cameras, handheld scanners, optical sensors on UGVs) configured to monitor the condition of the MMDs. In some embodiments, the detection of a damaged MMD may trigger a modular display replacement.

In some embodiments, the system may determine a plan for relocating residuals on MMDs being removed from a store. In some embodiments, instructions may be communicated to associates or automated systems for implementation. In some embodiments, the instructions may specify the placement of residuals on the new MMD. For example, newer items may be placed in the back and the older residual items may be placed in the front of the replacement MMD. In some embodiments, the system may provide instructions to combine or aggregate residuals on multiple MMDs to a selected MMD. The selected MMD may be located in the higher traffic area to encourage sell-through and minimizing product waste. In some embodiments, the system may perform a freshness/quality checks on residuals. For example, the system may use sensor measurements and/or expiration dates to determine whether a residual should be disposed of rather than restocked. For example, over-ripe banana or a crushed box may be disposed of instead of moved to another MMD. In some embodiments, the system may comprise sensors for reading expiration dates and/or other attributes of the product to automatically determine how to handle residual items. In some embodiments, the selection of a residual handling method may be based on external factors such as seasonal changes or upcoming events. For example, even if a residual item is viable, the system may not relocate it to another MMD because the estimated demand is insufficient to warrant taking shelf space away from other more popular products.

In some embodiments, an MMD may comprise a processor coupled to sensors for detecting inventory, MMD status, temperature, and/or location. In some embodiments, an MMD may comprise a power supply for powering the wheel system, sensors, and/or temperature controlled units. In some embodiments, an MMD may comprise couplers with power and/or data ports for connecting with other MMDs and/or a docking system at the store location or a stocking location. In some embodiments, the MMD may comprise "dressing" elements such as lighting, signage, visual displays (paper or electronic), and the like. In some embodiments, an MMD with a powered wheel system may comprise steering/navigation/control components and/or autonomous navigational capability.

In some embodiments, an MMD may comprise product label couplers and/or electronic display labels. In some embodiments, an MMD may comprise security features such as locked boxes for electronic devices, software, Jewelry, etc. In some embodiments, an MMD may comprise different types of supporting structures, e.g. clothing hangers, greeting card slots, lawn and garden holders, gun racks, etc. In some embodiments, product sensors on an MMD may comprise a temperature sensor, a moisture sensor, a chemical detector, a piezoelectric mat, and the like for monitoring product quantity and/or quality.

In some embodiments, a system for stocking a store comprises a plurality of mobile modular displays each configured to be stocked with a plurality of types of products in a plurality of shelf spaces at a stocking location, transport the products to a store location, and display the products at a store location, a sales history database, a store inventory database, and a control circuit coupled to the sales history database and the store inventory database, the control circuit configured to: detect a modular display replacement condition at a store location selling products on a plurality of deployed mobile modular displays, select a plurality of products to stock a mobile modular display from the plurality of mobile modular displays for the store location based on a sales history of the store location stored in the sales history database and a current inventory of the store location stored in the store inventory database, determine a planogram for the plurality of products selected for the mobile modular display, and output an instruction to a stocking system to stock the mobile modular display with the plurality of products in the plurality of shelf spaces according to the planogram and to transport the mobile modular display to the store location for display.

In some embodiments, a method for stocking a store comprises detecting, with a control circuit, a modular display replacement condition at a store location selling products on a plurality of deployed mobile modular displays, selecting, with the control circuit, a plurality of products to stock a mobile modular display for the store location based on a sales history of the store location stored in a sales history database and a current inventory of the store location stored in a store inventory database, the mobile modular display being selected from a plurality of mobile modular displays configured to be stocked with a plurality of types of products in a plurality of shelf spaces at a stocking location, transport the products to a store location, and display the products at the store location, determining, with the control circuit, a planogram for the plurality of products selected for the mobile modular display, and outputting an instruction to a stocking system to stock the mobile modular display with the plurality of products and transport the mobile modular display to the store location for display.

In some embodiments, an apparatus for stocking a store comprises a non-transitory storage medium storing a set of computer readable instructions, and a control circuit configured to execute the set of computer readable instructions which causes to the control circuit to: detect a modular display replacement condition at a store location selling products on a plurality of deployed mobile modular displays, select a plurality of products to fill a mobile modular display for the store location based on a sales history of the store location stored in a sales history database and a current inventory of the store location stored in on a store inventory database, the mobile modular display being selected from a plurality of mobile modular displays configured to be stocked with a plurality of types of products in a plurality of shelf spaces at a stocking location, transport the products to a store location, and display the products at the store location, determine a planogram for the plurality of products selected for the mobile modular display, and output an instruction to a stocking system to stock the mobile modular display with the plurality of products in the plurality of shelf spaces according to the planogram and to transport the mobile modular display to the store location for display.

In some embodiments, a system for store management comprises a plurality of mobile modular displays each configured to be stocked with a plurality of types of products in a plurality of shelf spaces at a stocking location, transport the plurality of types of products to a store location, and display the plurality of types of products at the store location, a store layout database, and a control circuit coupled to the store layout database and configured to: determine a store layout of a store location based on products assigned to mobile modular displays assigned to the store location, the store layout comprising in-store locations for the mobile modular displays assigned to the store location, aggregate location information from the mobile modular displays on display in the store location, compare the store layout associated with the store location in the store layout database and the location information of the mobile modular displays, and in an event that a discrepancy is detected between the store layout and the location information, generate a layout correction alert for the store location.

In some embodiments, a method for store management comprises tracking statuses of a plurality of mobile modular displays each configured to be stocked with a plurality of types of products in a plurality of shelf spaces at a stocking location, transport the plurality of types of products to a store location, and display the plurality of types of products at the store location, determining, with a control circuit, a store layout of a store location based on products assigned to mobile modular displays assigned to the store location, the store layout comprising in-store locations for the mobile modular displays assigned to the store location stored in a store layout database, aggregating location information for mobile modular displays on display in the store location, comparing, with the control circuit, the store layout associated with the store location in the store layout database and the location information of the mobile modular displays, and in an event that a discrepancy is detected between the store layout and the location information, generating, with the control circuit, a layout correction alert for the store location.

In some embodiments, an apparatus for store management comprises a non-transitory storage medium storing a set of computer readable instructions, and a control circuit configured to execute the set of computer readable instructions which causes to the control circuit to: track statuses of a plurality of mobile modular displays each being configured to be stocked with a plurality of types of products in a plurality of shelf spaces at a stocking location, transport the plurality of types of products to a store location, and display the plurality of types of products at the store location, determine a store layout of a store location based on products assigned to mobile modular displays assigned to the store location, the store layout comprising in-store locations for the mobile modular displays assigned to the store location stored in a store layout database, aggregate location information from the mobile modular displays on display in the store location, compare the store layout associated with the store location in the store layout database and the location information of the mobile modular displays, and in an event that a discrepancy is detected between the store layout and the location information, generate a layout correction alert for the store location.

In some embodiments, a system for managing a store inventory comprises a plurality of mobile modular displays each configured to be stocked with a plurality of types of products in a plurality of shelf spaces at a stocking location, transport the plurality of types of products to a store location, and display the plurality of types of products at the store location, a mobile modular display inventory database; and a control circuit coupled to the mobile modular display inventory database and configured to: track, in the mobile modular display inventory database, inventory levels of mobile modular displays in a store location, detect a modular display replacement condition for at least one mobile modular display based on the inventory levels of the mobile modular displays at the store location stored in the mobile modular display inventory database, cause a replacement mobile modular display to be deployed to replace the at least one mobile modular display on at a sales floor of the store location in response to detecting the modular display replacement condition, in an event that residual products remain on the at least one mobile modular display being replaced on the sales floor, determine a residual handling instruction selected from a plurality of residual handling methods for the residual products, and communicate the residual handling instruction to a user interface device.

In some embodiments, a method for managing a store inventory comprises tracking, with a control circuit, statuses of a plurality of mobile modular displays each configured to be stocked with a plurality of types of products in a plurality of shelf spaces at a stocking location, transport the plurality of types of products to a store location, and display the plurality of types of products at the store location, tracking, in a mobile modular display inventory database, inventory levels of mobile modular displays in a store location, detecting, with the control circuit, a modular display replacement condition for at least one mobile modular display based on the inventory levels of the mobile modular displays at the store location stored in the mobile modular display inventory database, causing a replacement mobile modular display to be deployed to replace the at least one mobile modular display on at a sales floor of the store location in response to detecting the modular display replacement condition, in an event that residual products remain on the at least one mobile modular display being replaced on the sales floor, determining, with the control circuit, a residual handling instruction selected from a plurality of residual handling methods for the residual products, and communicating the residual handling instruction to a user interface device.

In some embodiments, an apparatus for managing a store inventory, comprises a non-transitory storage medium storing a set of computer readable instructions and a control circuit configured to execute the set of computer readable instructions which causes to the control circuit to: track statuses of a plurality of mobile modular displays each configured to be stocked with a plurality of types of products in a plurality of shelf spaces at a stocking location, transport the plurality of types of products to a store location, and display the plurality of types of products at the store location, track, in a mobile modular display inventory database, inventory levels on mobile modular displays in a store location, detect a modular display replacement condition for at least one mobile modular display based on the inventory levels of the mobile modular displays at the store location stored in the mobile modular display inventory database, cause a replacement mobile modular display to be deployed to replace the at least one mobile modular display on at a sales floor of the store location in response to detecting the modular display replacement condition, in an event that residual products remain on the at least one mobile modular display being replaced on the sales floor, determine a residual handling instruction selected from a plurality of residual handling methods for the residual products, and communicate the residual handling instruction to a user interface device.

In some embodiments, an apparatus for product display comprises a housing of a mobile modular display, a wheel system coupled to the housing and configured to travel on the ground and provide mobility to the housing, a plurality of shelf spaces configured to hold a plurality of types of products in a specified arrangement during transport and display the plurality of types of products for customer selection and purchase on a sales floor of a store location, and a location device coupled to the housing, a control circuit coupled to the housing and configured to determine a location of the housing based on the location device.

In some embodiments, a method for product display comprises stocking a mobile modular display with a plurality of types of products at a stocking location based on a specified arrangement selected to display the plurality of types of products in a store location, transporting the mobile modular display to the store location, and placing the mobile modular display on a sales floor of the store location with a plurality of other mobile modular display to display the plurality of types of products for customer selection and purchase, wherein the mobile modular display comprises: a housing, a wheel system coupled to the housing and configured travel on the ground and provide mobility to the housing, a plurality of shelf spaces configured to hold the plurality of types of products in the specified arrangement; and a location device coupled to the housing, a control circuit coupled to the housing and configured to determine a location of the housing based on the location device.

In some embodiments, a system for product display comprises a plurality of mobile modular displays on a sales floor of a store location, a point of sales system configured to track inventory levels on the plurality of mobile modular display, and a central computer system configured to track statuses and locations of the plurality of the mobile modular display, wherein the plurality of mobile modular displays comprises one or more mobile modular displays comprises a housing, a wheel system coupled to the housing and configured travel on the ground and provide mobility to the housing, a plurality of shelf spaces configured to hold a plurality of types of products in a specified arrangement during transport and display the plurality of types of products for customer selection and purchase on the sales floor of the store location, and a location device coupled to the housing, and a control circuit coupled to the housing and configured to determine a location of the housing based on the location device.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for managing a store inventory of a store with mobile displays comprising:
 a plurality of mobile modular displays configured for placement onto product storage shelves on a sales floor of a store location, each of the mobile modular displays comprising a location sensor configured to indicate a location of a respective one of the mobile modular display on a product storage shelf on the sales floor of the store location, and a product sensor configured to monitor inventory levels of the respective one of the mobile modular displays, the mobile modular displays being configured to be stocked with a plurality of types of products and placed into a plurality of shelf spaces of the product storage shelves by an automated stocking system, the mobile modular displays being configured to transport the plurality of types of products to the store location, and display the plurality of types of products at the store location;

a mobile modular display inventory database; and a control circuit coupled to the mobile modular display inventory database and configured to:

track, with product sensors on mobile modular displays and in the mobile modular display inventory database, inventory levels of the mobile modular displays located in the shelf spaces of the product storage shelves in the store location;

detect a modular display replacement condition for at least one mobile modular display based on the inventory levels of the mobile modular displays at the store location stored in the mobile modular display inventory database;

cause a replacement mobile modular display to be deployed into a shelf space of a product storage shelf to replace the at least one mobile modular display in the shelf space of the product storage shelf on the sales floor of the store location in response to detecting the modular display replacement condition;

in an event that residual products remain on the at least one mobile modular display being replaced by the replacement mobile modular display in the shelf space of the product storage shelf on the sales floor, determine a residual handling instruction selected from a plurality of residual handling methods for the residual products; and communicate the residual handling instruction to automated units at the store location to handle the residual products.

2. The system of claim 1, wherein the residual handling instruction is selected based on one or more of: residual product type, residual product quantity, residual product condition, residual product sales history, products displayed on other mobile modular displays at the store location, and products assigned to be transported to the store location with the replacement mobile modular display.

3. The system of claim 1, wherein the residual handling instruction comprises returning the residual products to a mobile modular display stocking center with the at least one mobile modular display.

4. The system of claim 1, wherein the residual handling instruction comprises relocating the residual products to another modular display at the store location prior to returning the at least one mobile modular display to a mobile modular display stocking center.

5. The system of claim 1, wherein the residual handling instruction comprises moving the at least one mobile modular display to a backroom storage area at the store location and using the residual products to restock other mobile modular displays on the sales floor of the store location.

6. The system of claim 1, wherein the residual handling instruction comprises moving the residual products to the replacement mobile modular display when the replacement mobile modular display arrives at the store location.

7. The system of claim 1, wherein the control circuit is further configured to select a plurality of products to stock the replacement mobile modular display and leave room for the residual products on shelve spaces of the replacement mobile modular display.

8. The system of claim 1, wherein the inventory levels are tracked by one or more product sensors on one or more of the mobile modular displays and/or a point of sales system of the store location.

9. The system of claim 8, wherein the one or more product sensors comprises one or more of a Radio Frequency Identification (RFID) reader, an optical sensor, an optical light curtain, a weight sensor, and a mechanical pusher device.

10. The system of claim 1, wherein the modular display replacement condition comprises one or more: an quantity of one or more products on the at least one mobile modular display falling below a threshold, an quantity of all products on the at least one mobile modular display falling below a threshold, and a sales rate of one or more products on the at least one mobile modular display falling below a threshold.

11. A method for managing a store inventory of a store with mobile displays comprising:

tracking, with a control circuit, statuses of a plurality of mobile modular displays configured for placement onto product storage shelves on a sales floor of a store location, each of the mobile modular displays comprising a location sensor configured to indicate a location of a respective one of the mobile modular display on a product storage shelf on the sales floor of the store location, and a product sensor configured to monitor inventory levels of the respective one of the mobile modular displays, the mobile modular displays being configured to be stocked with a plurality of types of products and placed into a plurality of shelf spaces of the product storage shelves by an automated stocking system, the mobile modular displays being configured to transport the plurality of types of products to the store location, and display the plurality of types of products at the store location;

tracking, with product sensors on mobile modular displays and in a mobile modular display inventory database, inventory levels of the mobile modular displays located in the shelf spaces of the product storage shelves in the store location;

detecting, with the control circuit, a modular display replacement condition for at least one mobile modular display based on the inventory levels of the mobile modular displays at the store location stored in the mobile modular display inventory database;

causing a replacement mobile modular display to be deployed into a shelf space of a product storage shelf to replace the at least one mobile modular display in the shelf space of the product storage shelf on the sales floor of the store location in response to detecting the modular display replacement condition;

in an event that residual products remain on the at least one mobile modular display being replaced by the replacement mobile modular display in the shelf space of the product storage shelf on the sales floor, determining, with the control circuit, a residual handling instruction selected from a plurality of residual handling methods for the residual products; and communicating the residual handling instruction to automated units at the store location to handle the residual products.

12. The method of claim 11, wherein the residual handling instruction is selected based on one or more of: residual product type, residual product quantity, residual product condition, residual product sales history, products displayed on other mobile modular displays at the store location, and products assigned to be transported to the store location with the replacement mobile modular display.

13. The method of claim 11, wherein the residual handling instruction comprises returning the residual products to a mobile modular display stocking center with the at least one mobile modular display.

14. The method of claim 11, wherein the residual handling instruction comprises relocating the residual products to another modular display at the store location prior to returning the at least one mobile modular display to a mobile modular display stocking center.

15. The method of claim 11, wherein the residual handling instruction comprises moving the at least one mobile modular display to a backroom storage area at the store location and using the residual products to restock other mobile modular displays on the sales floor of the store location.

16. The method of claim 11, wherein the residual handling instruction comprises moving the residual products to the replacement mobile modular display when the replacement mobile modular display arrives at the store location.

17. The method of claim 11, further comprising:
selecting a plurality of products to stock the replacement mobile modular display and leave room for the residual products on shelve spaces of the replacement mobile modular display.

18. The method of claim 11, wherein the inventory levels are tracked by one or more product sensors on one or more of the mobile modular displays and/or a point of sales system of the store location.

19. The method of claim 11, wherein the modular display replacement condition comprises one or more: an quantity of one or more products on the at least one mobile modular display falling below a threshold, an quantity of all products on the at least one mobile modular display falling below a threshold, and a sales rate of one or more products on the at least one mobile modular display falling below a threshold.

20. An apparatus for managing a store inventory of a store with mobile displays, comprising:
a non-transitory storage medium storing a set of computer readable instructions; and
a control circuit configured to execute the set of computer readable instructions which causes to the control circuit to:
track statuses of a plurality of mobile modular displays configured for placement onto product storage shelves on a sales floor of a store location, each of the mobile modular displays comprising a location sensor configured to indicate a location of a respective one of the mobile modular display on a product storage shelf on the sales floor of the store location, and a product sensor configured to monitor inventory levels of the respective one of the mobile modular displays, the mobile modular displays being configured to be stocked with a plurality of types of products and placed into a plurality of shelf spaces of the product storage shelves by an automated stocking system, the mobile modular displays being configured to transport the plurality of types of products to the store location, and display the plurality of types of products at the store location;

track, with product sensors on mobile modular displays and in a mobile modular display inventory database, inventory levels on the mobile modular displays located in the shelf spaces of the product storage shelves in the store location;

detect a modular display replacement condition for at least one mobile modular display based on the inventory levels of the mobile modular displays at the store location stored in the mobile modular display inventory database;

cause a replacement mobile modular display to be deployed into a shelf space of a product storage shelf to replace the at least one mobile modular display in the shelf space of the product storage shelf on the sales floor of the store location in response to detecting the modular display replacement condition;

in an event that residual products remain on the at least one mobile modular display being replaced by the replacement mobile modular display in the shelf space of the product storage shelf on the sales floor, determine a residual handling instruction selected from a plurality of residual handling methods for the residual products; and communicate the residual handling instruction to automated units at the store location to handle the residual products.

\* \* \* \* \*